US 011900004B2

(12) United States Patent
Choi et al.

(10) Patent No.: US 11,900,004 B2
(45) Date of Patent: Feb. 13, 2024

(54) VEHICLE APPARATUS AND CONTROL METHOD

(71) Applicant: LG Electronics Inc., Seoul (KR)

(72) Inventors: Hyoungkyu Choi, Seoul (KR); Jaegu Yoon, Seoul (KR); Sangwoo Han, Seoul (KR); Junbum Park, Seoul (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 17/311,589

(22) PCT Filed: Dec. 7, 2018

(86) PCT No.: PCT/KR2018/015490
§ 371 (c)(1),
(2) Date: Jun. 7, 2021

(87) PCT Pub. No.: WO2020/116694
PCT Pub. Date: Jun. 11, 2020

(65) Prior Publication Data
US 2022/0019396 A1 Jan. 20, 2022

(51) Int. Cl.
*G06F 3/14* (2006.01)
*B60K 35/00* (2006.01)
*G06F 3/147* (2006.01)

(52) U.S. Cl.
CPC ............ *G06F 3/1438* (2013.01); *B60K 35/00* (2013.01); *B60K 2370/166* (2019.05); *B60K 2370/18* (2019.05); *G06F 3/147* (2013.01)

(58) Field of Classification Search
CPC ...... G06F 3/1438; G06F 3/147; G06F 3/1423; B60K 35/00; B60K 2370/166;
(Continued)

(56) References Cited

U.S. PATENT DOCUMENTS

| 10,963,383 B2 * | 3/2021 | Ono ........................ G06F 9/467 |
| 2007/0046680 A1 * | 3/2007 | Hedrick ................. G01C 23/00 |
| | | 345/503 |

(Continued)

FOREIGN PATENT DOCUMENTS

| JP | H03018974 | 1/1991 |
| JP | H11034766 | 2/1999 |

(Continued)

OTHER PUBLICATIONS

International Search Report and Written Opinion in International Appln. No. PCT/KR2018/015490, dated Sep. 6, 2019, 16 pages (with English translation).

*Primary Examiner* — Christopher E Leiby
(74) *Attorney, Agent, or Firm* — Fish & Richardson P.C.

(57) ABSTRACT

A vehicle apparatus according to one embodiment of the present invention comprises: a first control unit for executing a first application for a display, wherein the first control unit transmits display information about the first application to a first display unit; a second control unit for executing a second application for the display, wherein the second control unit transmits display information about the second application to a second display unit; a first switch unit connected to the first control unit and the second control unit, wherein the first switch unit receives the display information about the first application and the display information about the second application from the first control unit and the second control unit so as to transmit the display information about the first application and the display information about the second application to the first display unit and the second display nit, respectively; and a second switch unit for receiving the display information about the first application and the display information about the second (Continued)

application from the first control unit and the second control unit, respectively.

14 Claims, 16 Drawing Sheets

(58) Field of Classification Search
CPC .......... B60K 2370/18; B60K 2370/176; B60K 2370/178; B60K 2370/179; B60K 2370/182; B60K 2370/1876; G09G 5/363; G09G 2330/12; G09G 2358/00; G09G 2360/06; G09G 2380/10; B60W 50/08; B60W 50/14
See application file for complete search history.

(56) References Cited

U.S. PATENT DOCUMENTS

| | | | | |
|---|---|---|---|---|
| 2013/0254487 | A1* | 9/2013 | Tanaka | G06F 12/0808 711/123 |
| 2016/0170918 | A1* | 6/2016 | Butcher | G06F 13/4018 710/307 |
| 2016/0283314 | A1* | 9/2016 | Thanner | G06F 11/0793 |
| 2019/0068700 | A1* | 2/2019 | Nandkishor | G06F 11/0739 |
| 2019/0129489 | A1* | 5/2019 | Mednick | G06F 1/3243 |
| 2019/0179588 | A1* | 6/2019 | Chu | G08B 21/185 |
| 2020/0226078 | A1* | 7/2020 | Tanaka | G06F 12/0806 |

FOREIGN PATENT DOCUMENTS

| | | |
|---|---|---|
| JP | 2004249836 | 9/2004 |
| JP | 2014125006 | 7/2014 |
| KR | 1019960020413 | 6/1996 |

* cited by examiner

VEHICLE APPARATUS AND CONTROL METHOD

CROSS-REFERENCE TO RELATED APPLICATIONS

This application is a National Stage application under 35 U.S.C. § 371 of International Application No. PCT/KR2018/015490, filed on Dec. 7, 2018, the disclosures of which is incorporated by reference in its entirety.

TECHNICAL FIELD

The present invention relates to a device for a vehicle having a structure of multiple system on chips (SoCs) and a method for controlling the device.

More specifically, for example, the present invention may be applied to a technology of managing a plurality of displays in the vehicle and the structure of the multiple SoCs that controls the plurality of displays.

BACKGROUND

A vehicle traditionally functions as means of transportation for a user, but is equipped with various sensors, electronic devices, and the like for a convenience of the user to provide a driving convenience of the user. In particular, a development of an advanced driver assistance system (ADAS) for the driving convenience of the user, and by extension, of an autonomous vehicle is being actively conducted.

The vehicle may have at least one display device. The display device of the vehicle may display information necessary for operation of the vehicle. Because the information displayed is related to the operation of the vehicle, the information must be provided to the user in the vehicle.

As a function of the vehicle develops, the number of display devices in the vehicle may increase. An effective method for controlling a plurality of displays is required.

SUMMARY

The technical task of the present invention is to efficiently process resource requirements of a SoC that increases as the number of displays (digital cockpit domains) in a vehicle increases and integration between electronic control units (ECUs) in the vehicle is achieved.

The technical task of the present invention is to propose a method for using at least two SoCs in a vehicle at the same time.

The technical task of the present invention is to efficiently control and manage a structure between a plurality of displays and a plurality of SoCs in the vehicle, thereby constantly providing safety information necessary for operation of the vehicle.

The technical task to be achieved in the present disclosure is to solve such problems of the prior art. The technical tasks to be achieved in the present disclosure are not limited to the above-described technical task. Other technical issues not mentioned may be clearly understood by those of ordinary skill in the technical field to which the present disclosure belongs from the following description.

In order to solve the above technical problem, a device for a vehicle according to an embodiment of the present invention includes a first controller that executes a first application for a display, wherein the first controller transmits display information of the first application to a first display, a second controller that executes a second application for a display, wherein the second controller transmits display information of the second application to a second display, a first switch connected to the first controller and the second controller, wherein the first switch receives the display information of the first application and the display information of the second application respectively from the first controller and the second controller, and transmits the display information of the first application and the display information of the second application respectively to the first display and the second display, and a second switch for receiving the display information of the first application and the display information of the second application respectively from the first controller and the second controller.

In one implementation, when the first controller is in a fault mode and the second controller is in a normal mode, a mode of the second switch is changed to a fail-over mode, and the first switch performs a switching operation such that the second controller executes the first application and transmits the display information of the first application to the first display.

In one implementation, the second controller further executes a third application for a display, and transmits display information of the third application to a third display.

The device for the vehicle according to an embodiment of the present invention provides an effect that when a fault occurs in the display or the SoC in the vehicle, the display in the vehicle is able to display important information continuously without stopping an operation of displaying the information important for safety.

The device for the vehicle according to an embodiment of the present invention provides an effect that when faults occur in some of the plurality of SoCs in the vehicle, a SoC without the fault may perform a function and process information of a faulted SoC.

The device for the vehicle according to an embodiment of the present invention provides an effect of recovering the faulted SoC and reprocessing an operation before the fault occurrence.

The device for the vehicle according to an embodiment of the present invention provides an effect that when faults occur in some of the plurality of displays in the vehicle, another display may process information processed by the faulted display.

The effects of the present invention may not be limited to the above-mentioned effects, and effects that are not mentioned may be understood by those skilled in the art from the description of the specification or the claims.

BRIEF DESCRIPTION OF THE DRAWINGS

The accompanying drawings, which are included as part of the detailed description to help understand the present disclosure, provide embodiments of the present disclosure and describe the technical idea of the present disclosure together with the detailed description.

DETAILED DESCRIPTION

Figure 1:
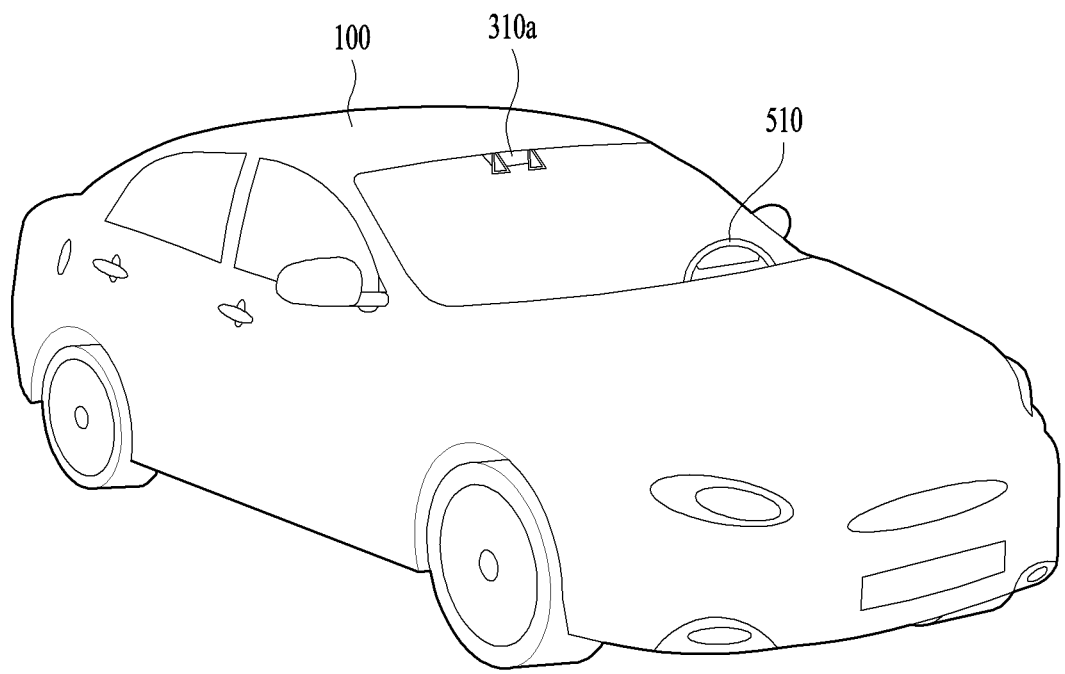
FIG. 1 is a diagram showing an exterior of a vehicle according to an embodiment of the present invention.
Figure 1:
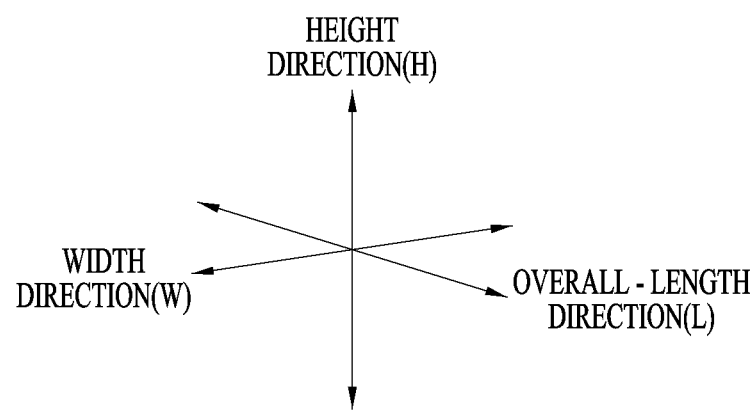
Figure 2:
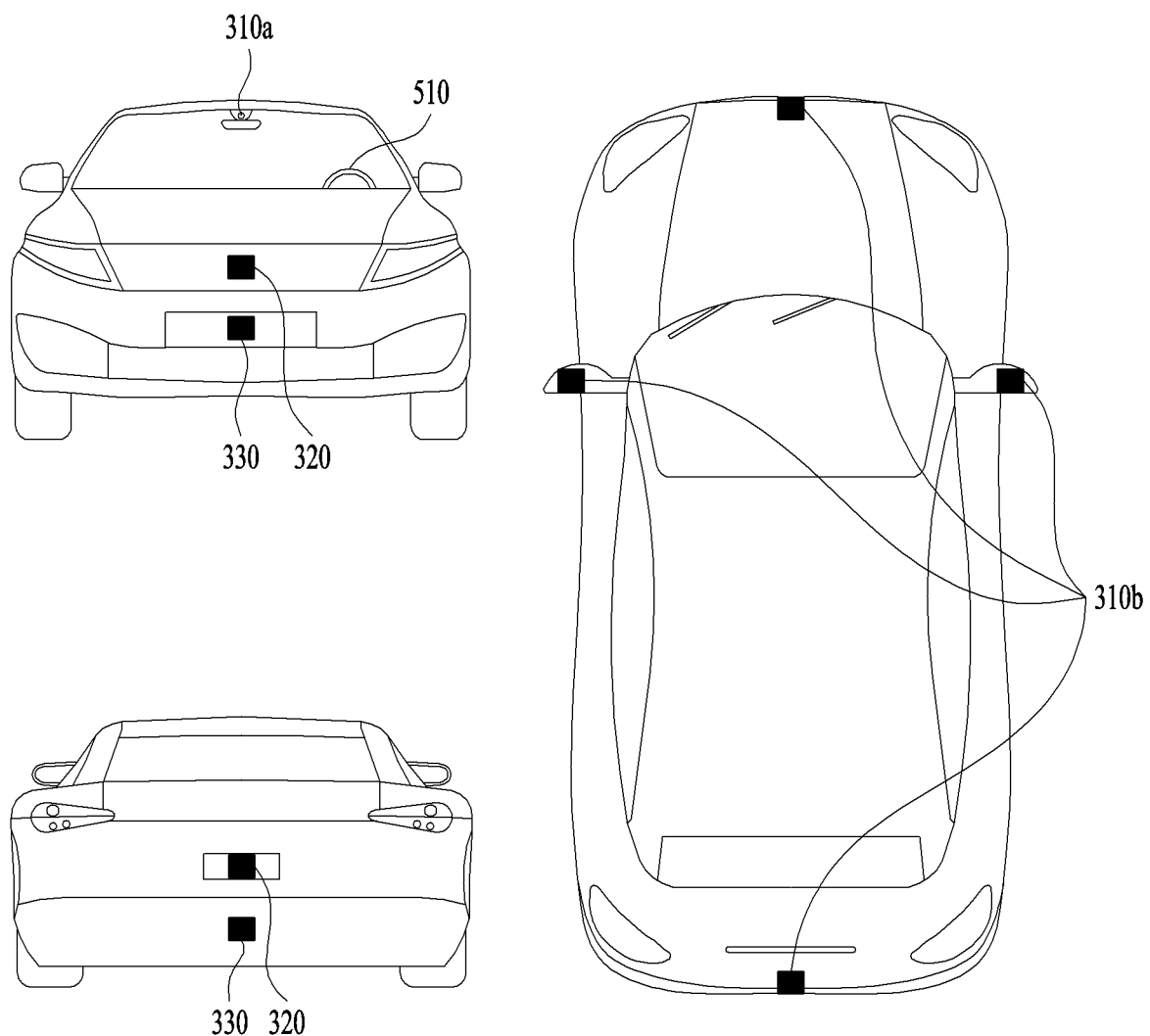
FIG. 2 is a diagram showing a vehicle externally viewed in various angles according to an embodiment of the present invention.
Figure 3:
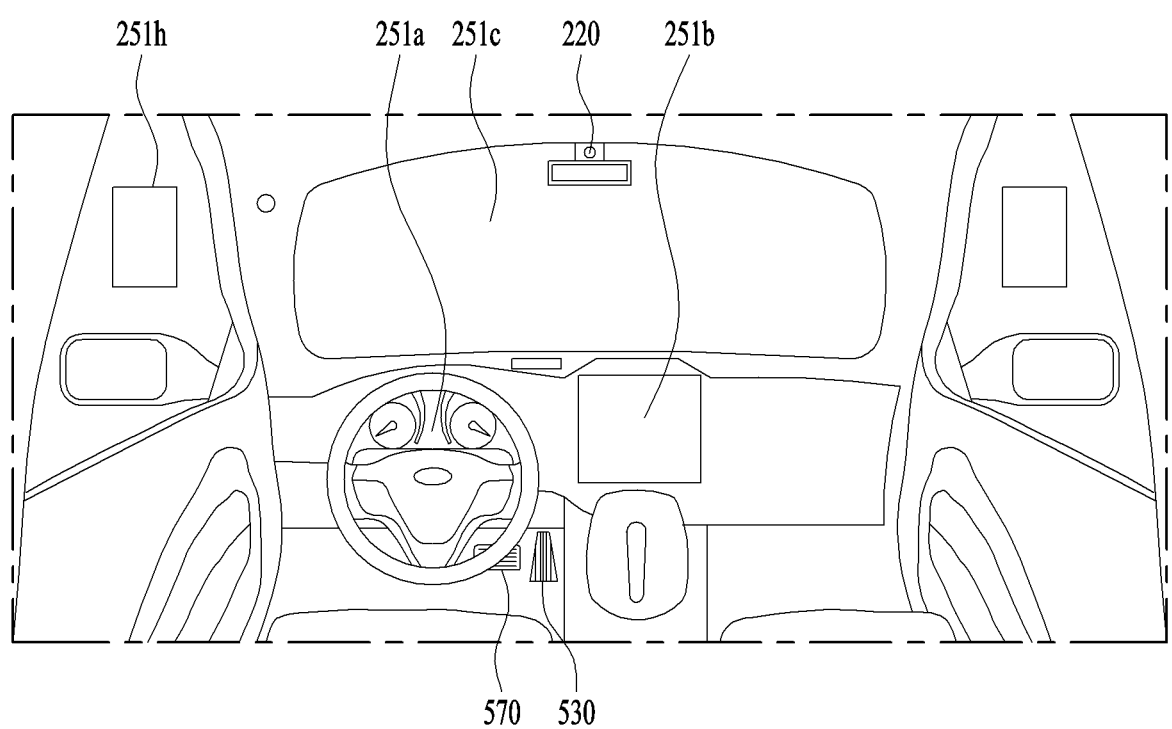
FIG. 3 and FIG. 4 are diagrams showing an interior of a vehicle according to an embodiment of the present invention.
Figure 4:
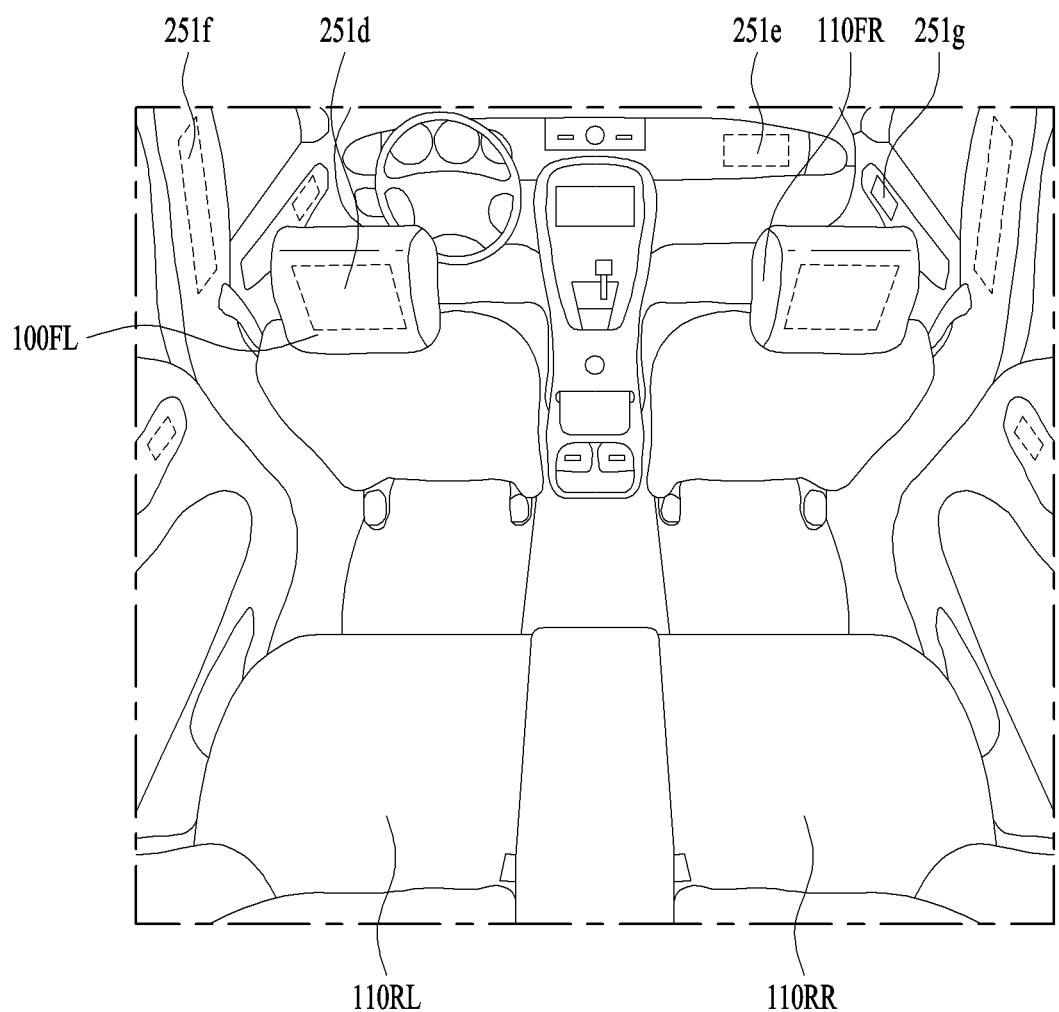

Hereinafter, a preferred embodiment of the present invention will be described in detail. Examples of description are shown in the accompanying drawings. With reference to the accompanying drawings, the detailed description below includes an embodiment that may be implemented according to an embodiment of the present invention, and further includes a preferred embodiment of the present invention. The detailed description includes details to provide a thorough understanding of the present invention. However, the present invention is not limited to the details, and it is obvious to those skilled in the art that the present invention may be executed without the details.

Most terms used in the present invention are selected from general ones widely used in the field. Some terms may be arbitrarily selected by the applicant, and their meanings are described in detail in the following description as needed. Therefore, the present invention should be understood based on the intended meaning of the term, not the simple name or meaning of the term.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle. The vehicle 100 may be switched to an autonomous mode or a manual mode in response to a user input. For example, in response to a user input received through a user interface apparatus 200, the vehicle 100 may be switched from a manual mode to an autonomous mode, or vice versa.

The vehicle 100 may be switched to the autonomous mode or to the manual mode based on driving environment information. The driving environment information may include at least one of the following: information on an object outside a vehicle, navigation information, and vehicle state information.

For example, a mode of the vehicle 100 may be switched from a manual mode to an autonomous mode or may be switched from the autonomous mode to the manual mode based on the driving environment information generated by an object detection device 300. For example, the mode of the vehicle 100 may be switched from the manual mode to the autonomous mode or may be switched from the autonomous mode to the manual mode based on the driving environment information received via a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700. For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

Figure 7:
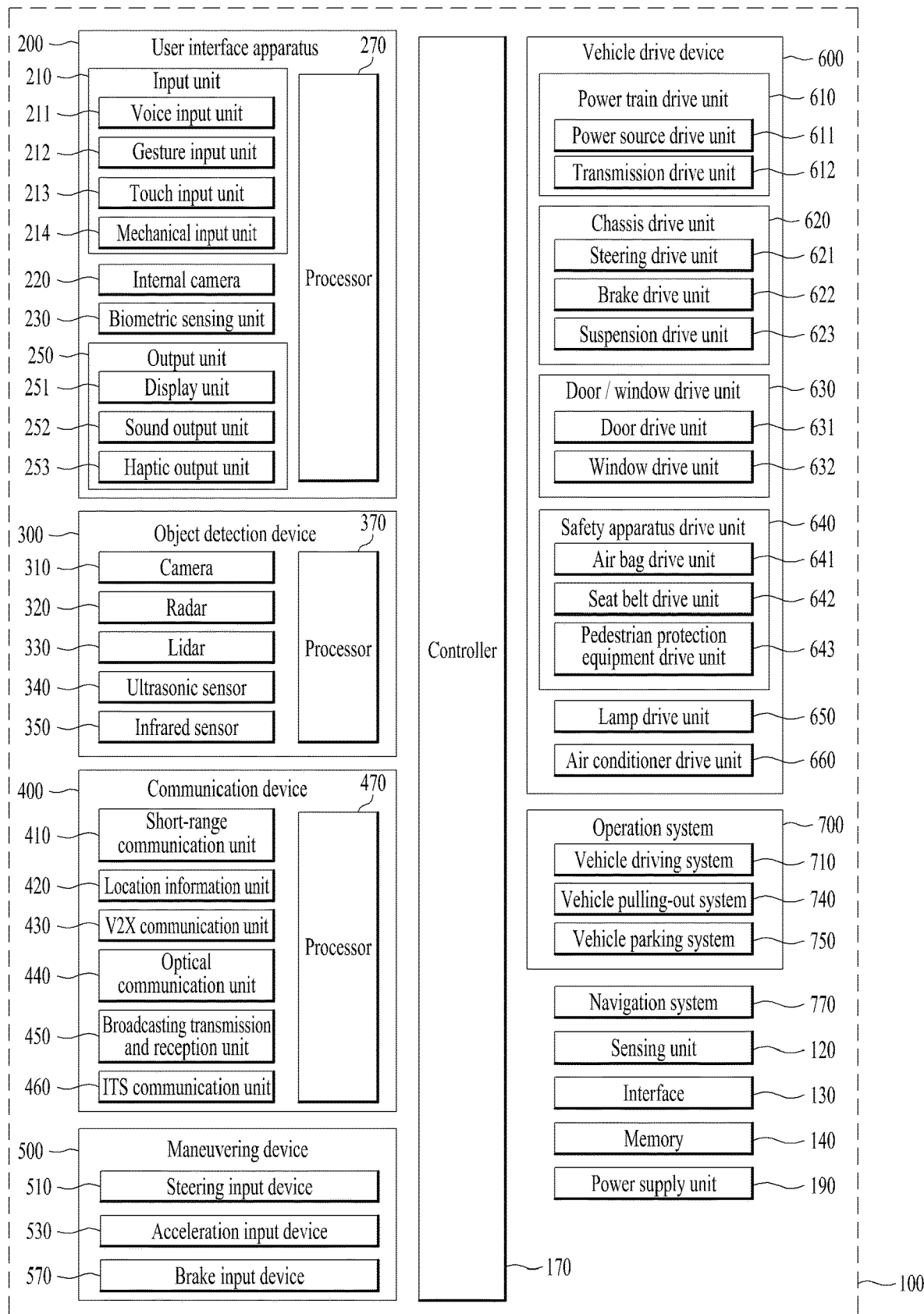
FIG. 7 is a block diagram referred to for description of a vehicle according to an embodiment of the present invention.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170. In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU). The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Moreover, the sensing unit 120, the interface unit 130, the memory 140, the power supply unit 190, the user interface device 200, the object detection device 300, the communication device 400, the maneuvering device 500, the vehicle drive device 600, the operation system 700 and the navigation system 770 may have individual processors or be integrated into the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170. The voice input unit 211 may include one or more microphones.

The gesture input unit 212 may convert a gesture input of a user into an electrical signal. The converted electrical signal may be provided to the processor 270 or the controller 170. The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors. The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170. The touch input unit 213 may include a touch sensor for sensing a touch input of a user. In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output. The output unit 250 may include at least one selected from among a display unit 251, a sound output unit 252, and a haptic output unit 253.

The display unit 251 may display graphic objects corresponding to various types of information. The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen. The display unit 251 may be implemented as a Head Up Display (HUD). When implemented as a HUD, the display unit 251 may include a projector module in order to output information through an image projected on a windshield or a window. The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200. In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100. Meanwhile, the user interface device 200 may be referred to as a display device for vehicle. The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100. The object may include various objects related to travelling of the vehicle 100.

Figure 5:
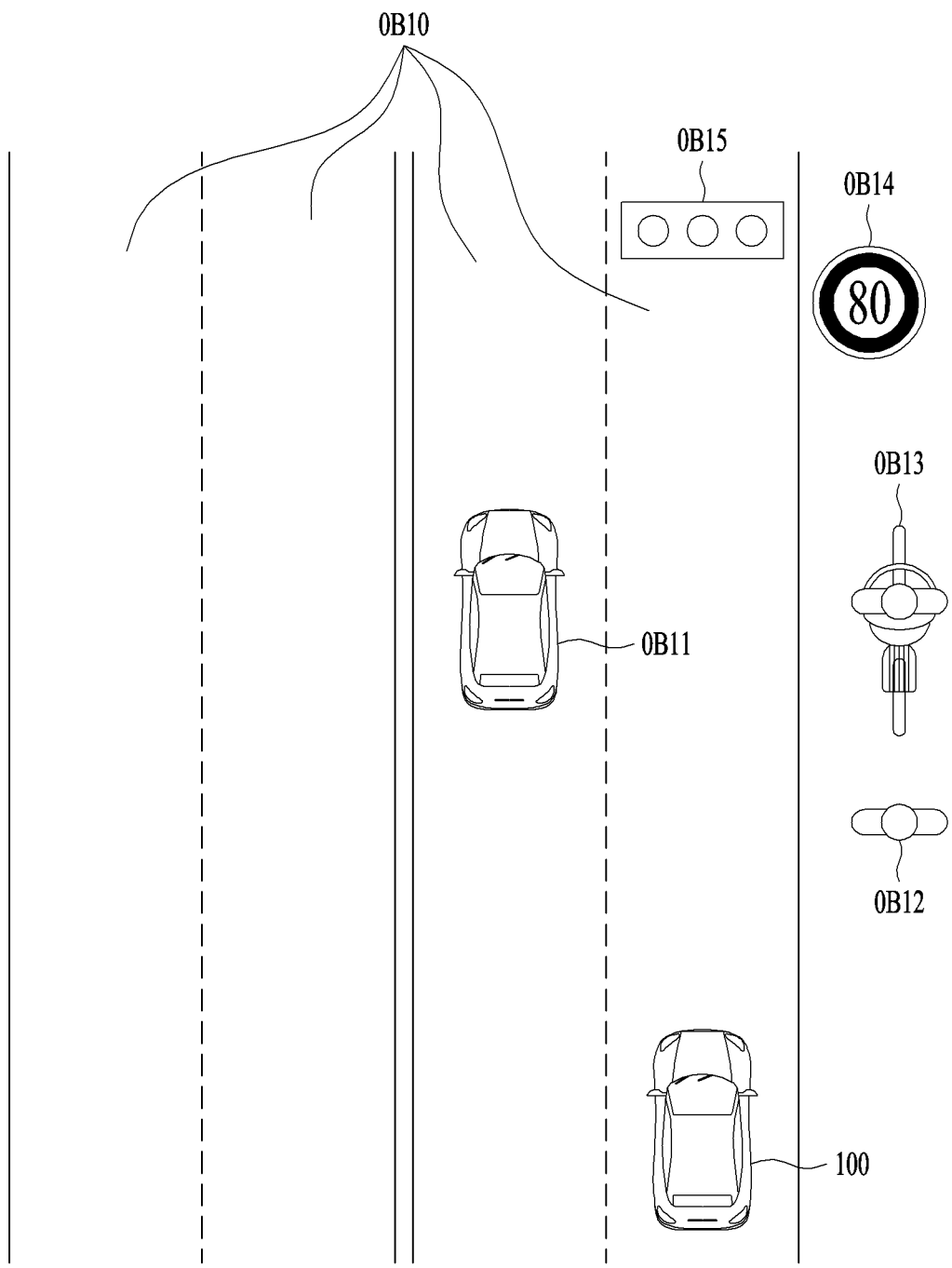
FIG. 5 and FIG. 6 are diagrams referred to for description of an object according to an embodiment of the present invention.
Figure 6:
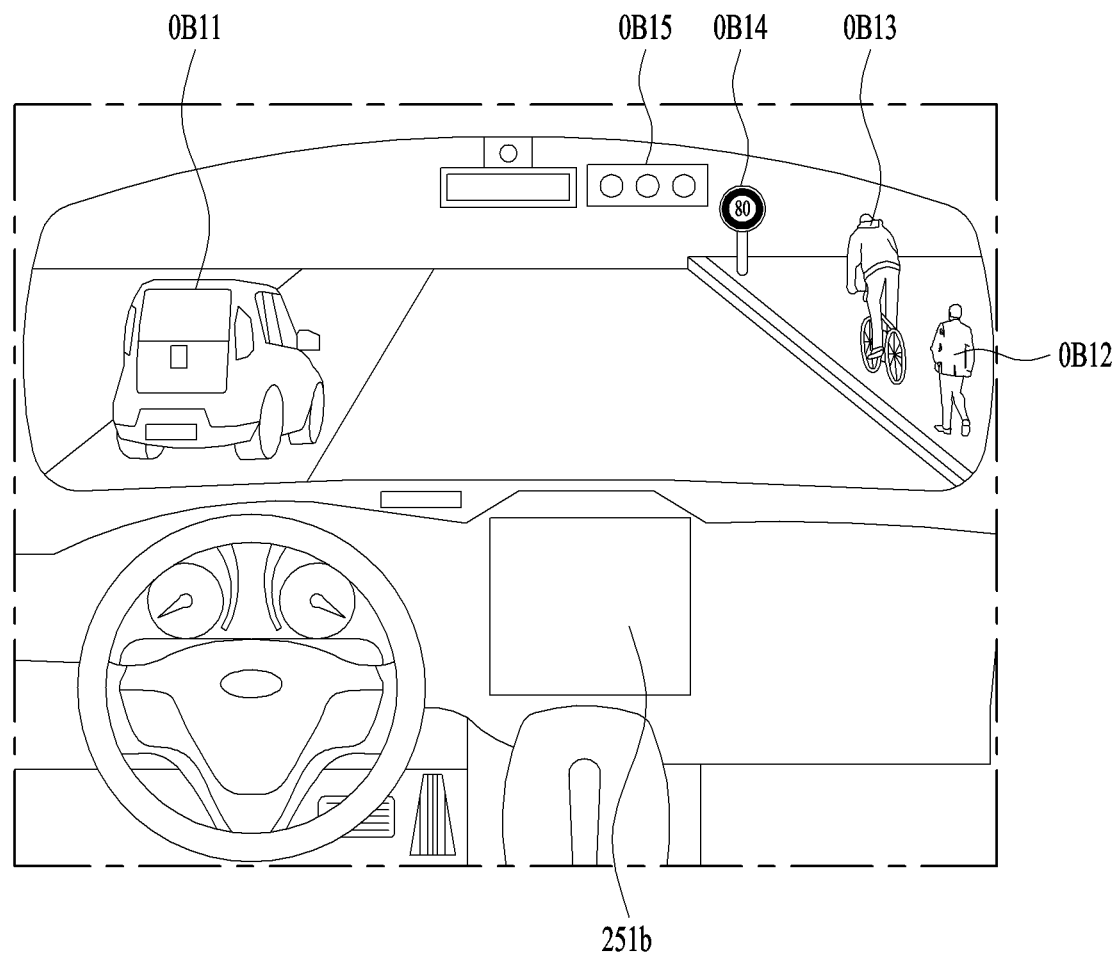

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The light may be light generated by a lamp provided in the nearby vehicle. The light may be light generated by a street light. The light may be solar light. The road may include a road surface, a curve, and slopes, such as an upward slope and a downward slope. The structure may be a body located around the road in the state of being fixed onto the ground. For example, the structure may include a streetlight, a roadside tree, a building, a traffic light, and a bridge. The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device 300 may be separated from or integrated with the sensing unit 120, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an Around View Monitoring (AVM) camera 310*b*, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar. When implemented as the drive type lidar, the lidar 300 may rotate by a motor and detect an object in the vicinity of the vehicle 100. When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object. The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object. The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object. The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300. The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310*a*.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100. The object detection device 300 may operate under control of the controller 170.

The communication device 400 is configured to perform communication with an external device. Here, the external device may be a nearby vehicle, a mobile terminal, or a server. To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470. In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus). The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400. In some embodiments, the communication device 400 may include a plurality of processors 470, or may not include the processor 470. In a case where the communication device 400 does not include the processor 470, the communication device 400 may operate under control of the controller 170 or a processor of a device inside of the vehicle 100.

Meanwhile, the communication device 400 may implement a vehicle display device, together with the user interface device 200. In this case, the vehicle display device may be referred to as a telematics device or an Audio Video Navigation (AVN) device. The communication device 400 may operate under control of the controller 170.

The maneuvering device 500 is configured to receive a user input for driving the vehicle 100. In the manual mode, the vehicle 100 may operate based on a signal provided by the maneuvering device 500. The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100. The vehicle drive device 600 may include a power train drive unit 610, a chassis drive unit 620, a door/window drive unit 630, a safety apparatus drive unit 640, a lamp drive unit 650, and an air conditioner drive unit 660. In some embodiments, the vehicle drive device 600 may further include other components in addition to the aforementioned components, or may not include some of the aforementioned components. Meanwhile, the vehicle drive device 600 may include a processor. Each unit of the vehicle drive device 600 may include its own processor.

The power train drive unit 610 may control the operation of a power train. The power train drive unit 610 may include a power source drive unit 611 and a transmission drive unit 612.

The power source drive unit 611 may control a power source of the vehicle 100. In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission. The transmission drive unit 612 may adjust the state of the transmission. The transmission drive unit 612 may adjust a state of the transmission to a drive (D), reverse (R), neutral (N), or park (P) state. Meanwhile, in a case where an engine is the power source, the transmission drive unit 612 may adjust a gear-engaged state to the drive position D.

The chassis drive unit 620 may control the operation of a chassis. The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100. Meanwhile, the suspension drive unit 623 may control a plurality of suspensions individually.

The door/window drive unit 630 may perform electronic control of a door apparatus or a window apparatus inside the vehicle 100. The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor. The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750. In some embodiments, the operation system 700 may further include other components in addition to the aforementioned components, or may not include some of the aforementioned component. Meanwhile, the operation system 700 may include a processor. Each unit of the operation system 700 may include its own processor.

Meanwhile, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the afore-described manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the afore-described autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an embodiment, the processor of the operation system 700 may drive the vehicle 100 along the learned driving route by controlling the operation system 710 in the operating mode.

According to an embodiment, the processor of the operation system 700 may pull out the vehicle 100 from the learned parking space by controlling the vehicle pulling-out system 740 in the operating mode.

According to an embodiment, the processor of the operation system 700 may park the vehicle 100 in the learned parking space by controlling the vehicle parking system 750 in the operating mode. Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface device 200, the object detection device 300, the communication device 400, the vehicle drive device 600, and the controller 170.

The driving system 710 may perform driving of the vehicle 100. The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300. The driving system 710 may perform driving of the vehicle 100 by providing a control signal to the vehicle drive device 600 in response to reception of a signal from an external device through the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170. The driving system 710 may be referred to as a vehicle driving control device.

The vehicle pulling-out system 740 may perform an operation of pulling the vehicle 100 out of a parking space. The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space. The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400. In some embodiments, the navigation system 770 may be classified as an element of the user interface device 200.

Figure 8:
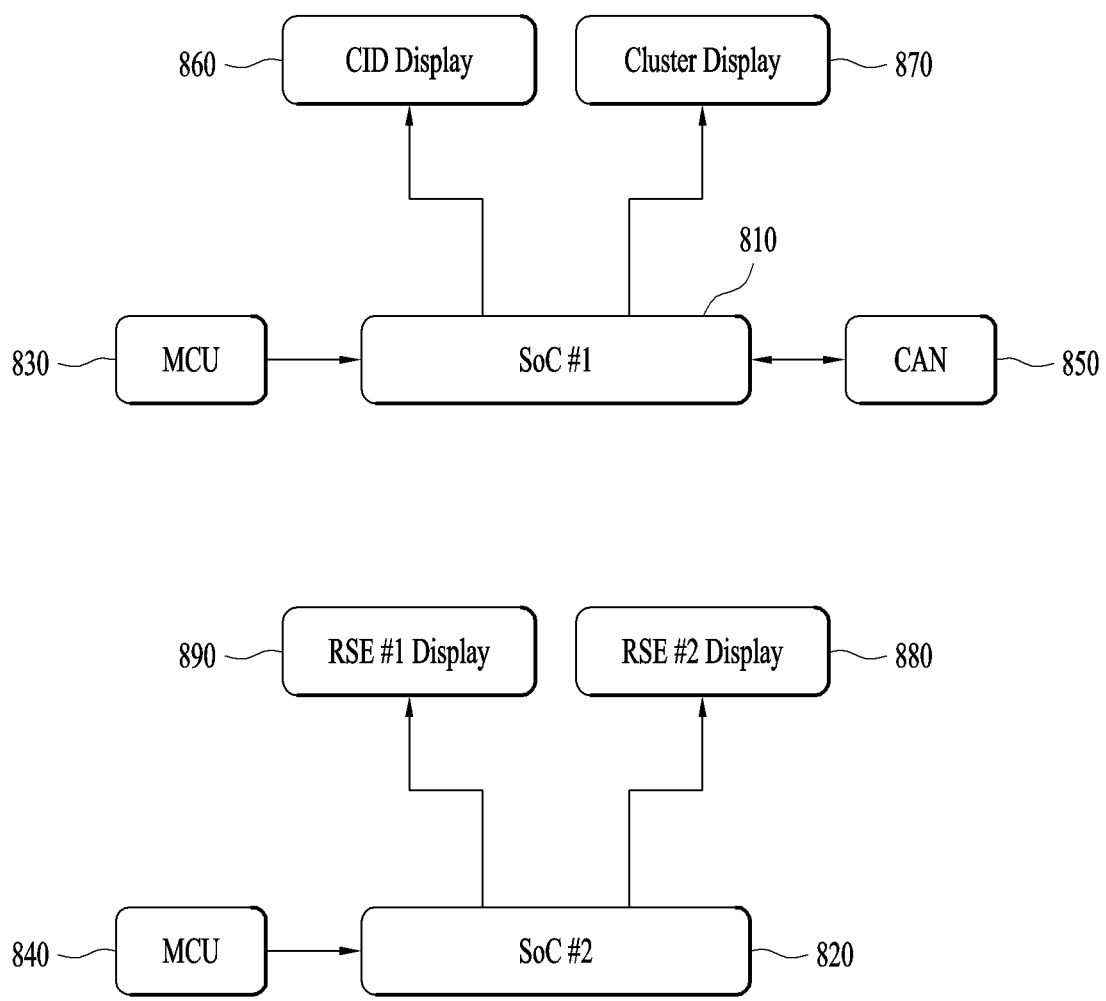
FIG. 8 shows a configuration of a device for a vehicle including multiple system on chips (SoCs) according to an embodiment of the present invention.

FIG. 8 shows a configuration of a device for a vehicle including multiple system on chips (SoCs) according to an embodiment of the present invention.

Hereinafter, the device for the vehicle according to an embodiment of the present invention may correspond to the vehicle 100 illustrated in FIG. 7 or a component included in the vehicle.

The device for the vehicle includes a single chip system (a system on chip, hereinafter, referred to as a SoC or the like), and the SoC processes signals for multiple displays and processors in the device for the vehicle. The device for the vehicle according to an embodiment of the present invention may include at least one SoC, and the SoC may communicate with a display in the vehicle, a switch for information communication, a network device, a memory, and the like. Hereinafter, the SoC may be referred to as a controller or the like according to an embodiment.

Referring to FIG. 8, the device for the vehicle includes a plurality of SoCs 810 and 820, and each SoC transmits and receives signals or information to and from a plurality of displays, micro controller units (MCUs) 830 and 840, the network device, or a controller area network (CAN) 850. According to an embodiment, the plurality of displays includes a center information display (CID display) 860, a cluster display 870, rear seat entertainment displays (RSE displays) 880 and 890, and the like.

A first SoC 810 receives a signal from the micro controller unit and transmits information to be displayed on the center information display and the cluster display, which are displays located at a front portion of the vehicle. In addition, the first SoC may transmit and receive the signals by communicating with the network (CAN).

The second SoC 820 receives a signal from the micro controller unit and transmits information to be displayed on the displays 880 and 890 located at a rear portion of the vehicle.

FIG. 8 shows an operation in which the plurality of SoCs independently classify and process the plurality of displays. The device for the vehicle shown in FIG. 8 has a plurality of MCUs for the plurality of SoCs, and the MCU in communication with each SoC periodically identifies whether the connected SoC is operating normally. The periodic identification of whether the operation is normal may be performed based on a polling method, and additional processing resulted from the periodic identification may be required. In addition, when the SoC does not operate normally, the MCU must reset and reboot the SoC.

In one example, when a fault occurs in one SoC, a plurality of displays connected to the SoC may not be able to process normal display operations while the SoC is recovered through the reset and the reboot. In other words, while the fault occurs in the first SoC 810 and the MCU 830 recovers the first SoC, the center information display 860 and the cluster display 870 connected to the first SoC may not be able to provide information necessary for travel to the driver, and an accident may occur while the vehicle is traveling resulted from the abnormal information processing of the display. An embodiment of the present invention regarding fault handling of the SoC will be described below with reference to FIG. 9.

According to one embodiment, the plurality of displays may correspond to the same or similar components that process the displays in the vehicle, and a connection relationship between the SoC and the display may be changed or changeable according to the embodiment.

Figure 9:
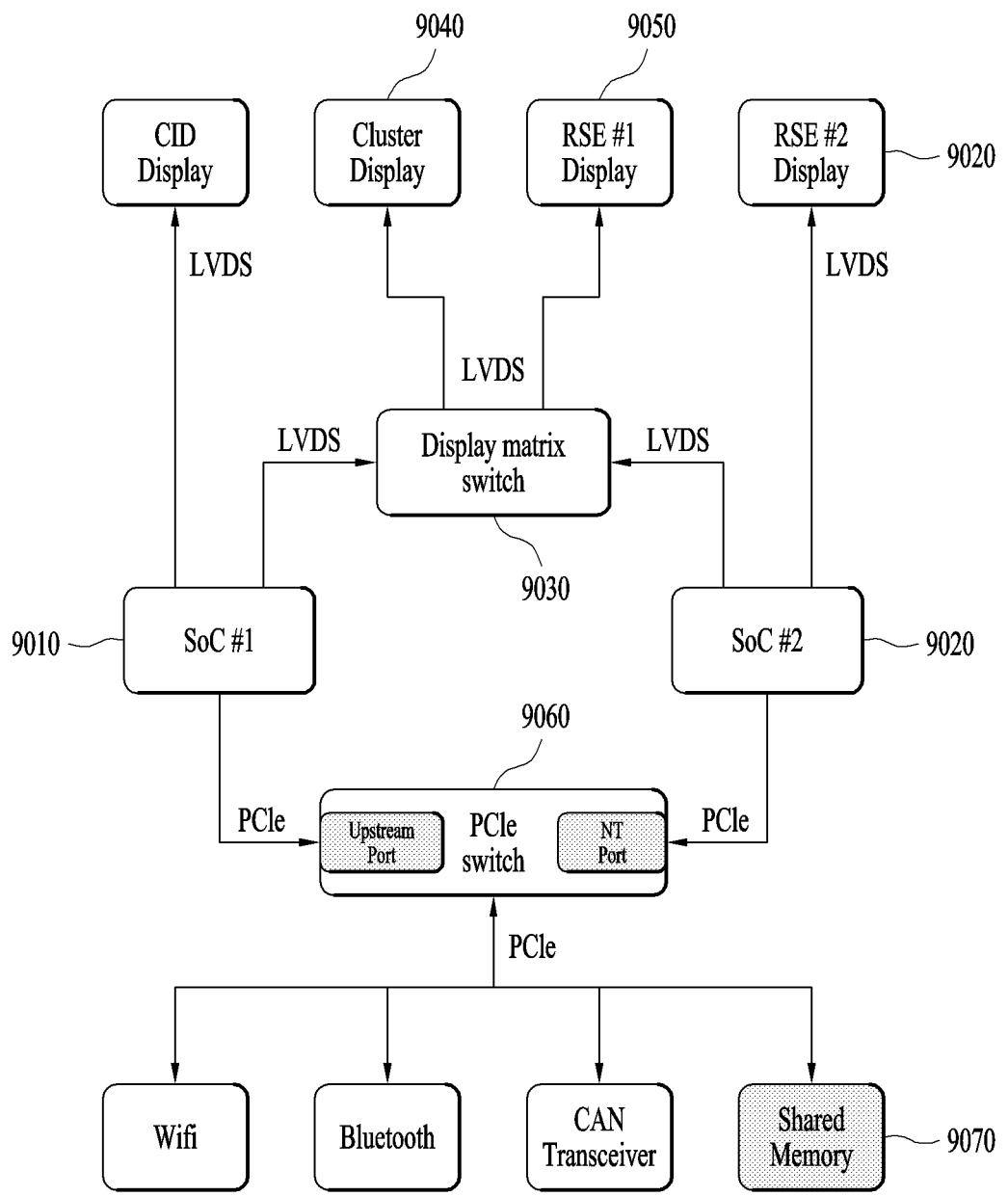
FIG. 9 shows control processing of a device for a vehicle including multiple SoCs according to an embodiment of the present invention.

FIG. 9 shows control processing of a device for a vehicle including multiple SoCs according to an embodiment of the present invention.

A device for a vehicle according to an embodiment of the present invention includes a plurality of SoCs 9010 and 9020, a plurality of displays (a CID display, a cluster display, and RES displays), and/or a display matrix switch 9030. In this connection, the display matrix switch may be referred to as a first switch.

A first SoC 9010 is connected to the center information display and the display matrix switch 9030 to perform in-vehicle communication based on a low voltage differential signaling (LVDS) method.

A second SoC 9020 is connected to the rear seat entertainment display and the display matrix switch to perform the in-vehicle communication based on the LVDS method.

As shown in FIG. 9, the vehicle may include the plurality of SoCs, and the SoC may execute an application related to the display. According to one embodiment, when the SoC executes an application related to cluster information, cluster display information generated as a result of the execution of the application may be transmitted by the SoC to the cluster display. Thereafter, the cluster display displays the received cluster display information and provides the received cluster display information to the user of the vehicle. According to an embodiment, the application and the display information of the application have various types, and each application may be referred to as a first application, a second application, or the like. In addition, the device for the vehicle of the present invention includes a multi SoC structure, and each SoC may be referred to as a first controller, a second controller, or the like.

According to one embodiment, a cluster display 9040 and a rear seat entertainment display 9050 are not directly connected to the SoCs 9010 and 9020, but are connected to the display matrix switch to perform the LDVS-based in-vehicle communication. Therefore, when a fault occurs in the first SoC 9010 and normal output processing is impossible in the cluster display 9040, the display matrix switch 9030 connects the second SoC 9020 with the cluster display to support switching processing such that the cluster display may continue to operate normally without delay even after the fault occurs.

In this connection, in comparison between the embodiment of FIG. 8 and the embodiment of FIG. 9, in the case of FIG. 8, when the fault occurs in the first SoC 810, while the MCU 830 performs the recovery processing, not only the information output of the display is delayed, but also the second SoC 820 or the MCU 840 is not able to support the additional processing that may help the first SoC in which the fault has occurred. On the other hand, in the case of FIG. 9, because the plurality of SoCs are interconnected through the display matrix switch unit and a switch 9060, the fault recovery processing may be efficiently performed as described above. In this connection, the switch 9060 may be referred to as a second switch or the like.

The display matrix switch 9030 is connected to the plurality of SoCs and the plurality of displays, and processes information transmission between the SoCs and the displays. The display matrix switch may determine or flexibly change the connection relationship or a mapping relationship between the SoC and the display through a switching operation. A specific operation of the display matrix switch will be described in detail below.

Furthermore, the device for the vehicle according to an embodiment of the present invention further includes the switch (PCIe switch) 9060. According to one embodiment, the switch 9060 refers to a switch or the like that processes communication, storage, application, and the like for data in the vehicle.

According to an embodiment, the switch 9060 may be connected to a first SoC 9010 through an upstream port of a switch, and may be connected to the second SoC 9020 through an NT port. The switch may be connected to a Wi-Fi, a Bluetooth, a CAN transceiver, and/or a shared memory 9070 to process data communication. Therefore, in the present invention, the plurality of SoCs may share information with each other through the switch to perform the information processing about the display together.

The device for the vehicle according to an embodiment of the present invention does not require a separate MCU. Instead of the procedure for the MCU to identify whether the SoC operates normally according to the embodiment of FIG. 8, in the case of the embodiment of FIG. 9, the switch 9020 and/or an SoC in which the fault has not occurred among the plurality of SoCs may detect the fault generated in the SoC.

In other words, while the first SoC 9010 performs processing and execution the cluster-related application for the cluster display 9040 and outputs the application on the cluster display, a fault such as latch-up may occur in the first SoC. In this connection, the switch 9060 connected to the first SoC detects the fault, and the second SoC executes the cluster application instead and outputs information related to the cluster application on the cluster display through the display matrix switch 9030. The driver may receive the information related to the cluster app closely related to safety without loss and delay. The plurality of displays, the SoC, the switch, and sensor devices located in the display matrix switch process the above-described operation under a minimum switching delay that is not perceptible to the driver. Furthermore, according to an embodiment, the device for the vehicle according to an embodiment of the present invention further includes the shared memory 9070 between the plurality of SoCs to backup context information processed by the SoC in advance before the fault occurs and use the context information when the fault occurs in the SoC, thereby recovering the SoC and the display quickly.

Specifically, according to an embodiment, a PCIe switch may be used as the switch 9060 and the switch 9060 may support a non-transparent bridging (NTB) function. As shown in FIG. 9, the switch includes an upstream port and an NT port, and the NT port is able to provide an upstream port function depending on the NTB function, so that a reset delay may be effectively eliminated when the fault occurs in the SoC connected to the switch. In addition, the switch communicates with the SoC, a network/memory, and the like connected to the switch depending on the NTB function, so that information of the faulted SoC may be immediately processed by another SoC.

According to an embodiment, as described above, when the first SoC fault occurs, the second SoC may continuously output safety information necessary for the travel following the first SoC using the NTB function of the switch. Furthermore, when the first SoC in which the fault has occurred is completely recovered through the reset, the first SoC from which the fault has been recovered may output the safety information. In other words, the present invention provides the effect of continuously outputting the information on the display using another SoC while the SoC recovers the fault.

Figure 10:
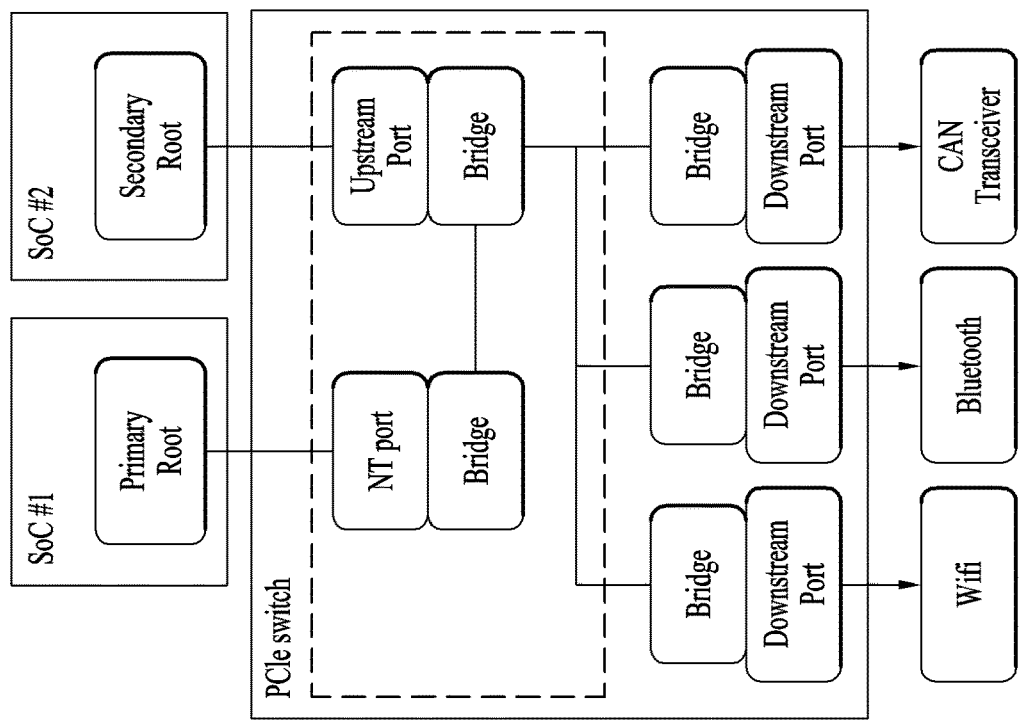
FIG. 10 shows an operation of controlling an occurrence of a fault in a device for a vehicle according to an embodiment of the present invention.
Figure 10:
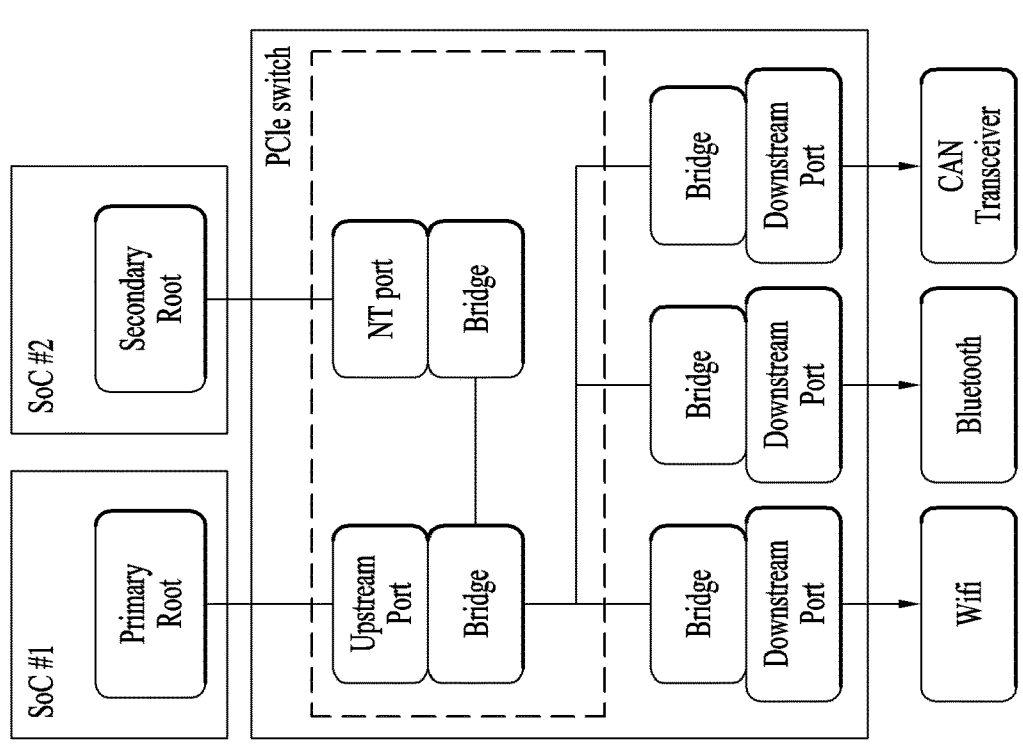

FIG. 10 shows an operation of controlling an occurrence of a fault in a device for a vehicle according to an embodiment of the present invention. FIG. 10 is a diagram showing in detail a process in which the device for the vehicle to which the plurality of SoCs are connected shown in FIG. 9 performs the switching operation of the switch for fault responsive processing.

Specifically, as shown on a left side of FIG. 10, assuming an embodiment in which the first SoC plays a master processor (primary root) role and the second SoC plays a relatively secondary processor (secondary root) role, the first SoC may be connected to the upstream port of the switch, and the second SoC may be connected to the NT port. Furthermore, the switch may be connected to the network device (the wifi, the Bluetooth, and the CAN transceiver) and/or the memory through a bridge and a downstream port.

According to an embodiment, when the fault occurs in the first SoC, a connection relationship between components in the switch may be switched from that shown in the left side of FIG. 10 to that shown in a right side of FIG. 10. In other words, in order for the second SoC to act as the master processor instead of the first SoC in which the fault has occurred, a port of the switch connected to the second SoC plays a role of the upstream port, whereas a port of the switch connected to the first SoC plays a role of the NT port. The network device or the memory that was transmitting the information to the first SoC may continuously provide the information to the second SoC through the switching of the switch. Therefore, even when the fault occurs in the first SoC, the second SoC may take over the operation of the first SoC without the delay.

In one example, because the switching operation of the switch shown in FIG. 10 may be processed through the reset from a software point of view, instant switching from left side to the right side of FIG. 10 is possible. Therefore, another SoC may immediately access the port, the network, the memory, and the like connected to the SoC that is not able to operate normally without the delay.

As described above, in the present invention, another SoC may constantly provide the information (the safety information and the like) necessary for driving to a main display through the switching operation between the plurality of SoCs even when the main display does not operate normally because of a failure of the SoC, and sufficient time to recover the faulted SoC may be secured. The device for the vehicle of the present invention provides fast fault responsive processing such that the user (the driver, passengers other than the driver, and the like) of the device for the vehicle of the present invention cannot be aware of the delay caused by the switching.

Figure 11:
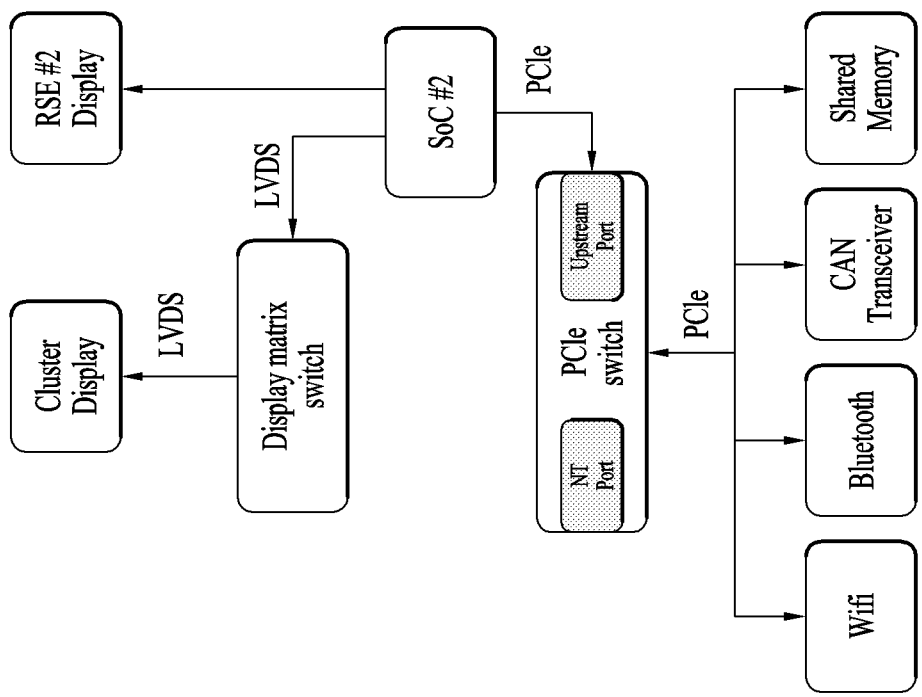
FIG. 11 is a diagram illustrating operations before and after an occurrence of a fault of a SoC of a device for a vehicle according to an embodiment of the present invention.
Figure 11:
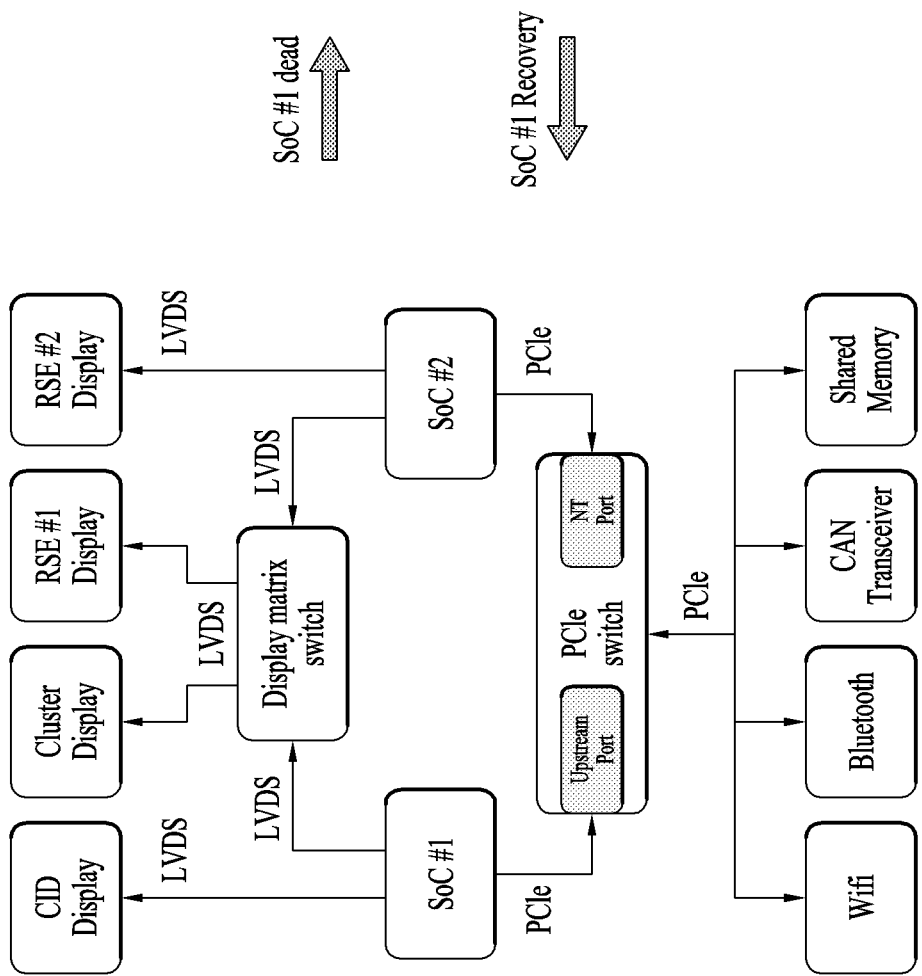

FIG. 11 is a diagram illustrating operations before and after an occurrence of a fault of a SoC of a device for a vehicle according to an embodiment of the present invention.

Referring to FIG. 11, a device for a vehicle according to an embodiment of the present invention includes a plurality of SoCs and a plurality of displays. According to an embodiment, the SoC and the display may be directly connected to each other, and the SoC may be connected to the display through a display matrix switch. FIG. 11 shows that a cluster display and a rear display (a rear seat entertainment) are connected to the SoC through the display matrix switch, but the connection relationship between the display matrix switch and the plurality of displays may be changed and modified according to an embodiment. According to an embodiment, FIG. 11 illustrates the structure in which the cluster display is connected to the display matrix switch considering that the cluster information is essential information for the safety and assuming an embodiment in which a fault occurs in a first SoC in charge of the cluster display.

A left side of FIG. 11 shows a state in which the first SoC and the second SoC are operating normally. In this connection, assuming that the fault has occurred in the first SoC (when the first SoC is in a fault mode and the second SoC is in a normal mode), switching occurs as shown on a right side of FIG. 11. A specific switching process is as described above in FIG. 10. An embodiment in which the first SoC is outputting information on a center information display (CID Display) and a cluster display, and the second SoC is outputting information on a first rear display (RSE #1 display) and a second rear display (RSE #2 display) is assumed. Because the first SoC is playing the main processor role, the first SoC is connected to the upstream port of a switch, and the second SoC is connected to the NT port of the switch.

In this connection, fault responsive processing of the second SoC and fault recovery of the first SoC in the case in which the fault has occurred in the first SoC will be described. The center information display and the cluster display through which the faulted first SoC was outputting the information are no longer able to receive the information, and thus are not able to perform normal display. It is assumed that an importance and a priority of the cluster display that provides travel-related safety information to the driver are greater than an importance and a priority of the center information display in an emergency situation in which the fault has occurred. Thereafter, the display matrix switch switches a connection relationship between the first SoC and the cluster display to a connection relationship between the second SoC and the cluster display such that the second SoC operating normally may access the cluster display. A function of the SoC in the fault mode may be provided by the SoC in the normal mode through the switching operation of the display matrix switch.

Furthermore, the switch switches the function of the NT port connected to the second SoC to the upstream port, so that the second SoC may access the network and the memory connected to the first SoC before the fault occurrence. As a result, after the occurrence of the first SoC fault, the second SoC may continuously communicate with the network device and the memory to continuously output the information on the cluster display and the second rear display. The switching operation of the present invention is a software reset operation and is processed only with a minimum delay that is not perceptible to the driver. In this connection, the switching operation of the switch may be referred to as a fail-over mode or the like according to an embodiment.

In addition, while the above-described second SoC performs the fault occurrence response and processing, the first SoC is independently recovered from the fault. When the first SoC is completely recovered from the fault, the present invention switches the connection relationship again as shown on the left side of FIG. 11. As a result, the present invention may continuously provide important information to the driver even when the fault occurs in the SoC, and further secure time for the faulted SoC to recover from the fault.

As described above, the present invention does not necessarily require a reset operation from a hardware point of view that requires a relatively long delay for the fault recovery. That is, the present invention makes it possible to change the SoC connection easily through the reset from the software point of view, the switching of the display matrix switch, and the port movement of the switch. According to an embodiment, as well as immediate access switching of the SoC, backup of the display-related application information or the context information processed by the SoC prior to the occurrence of the fault in a shared memory are possible. In addition, the SoC for the fault response immediately accesses the information backed up after the occurrence of the fault, so that the application execution is not interrupted.

Figure 12:
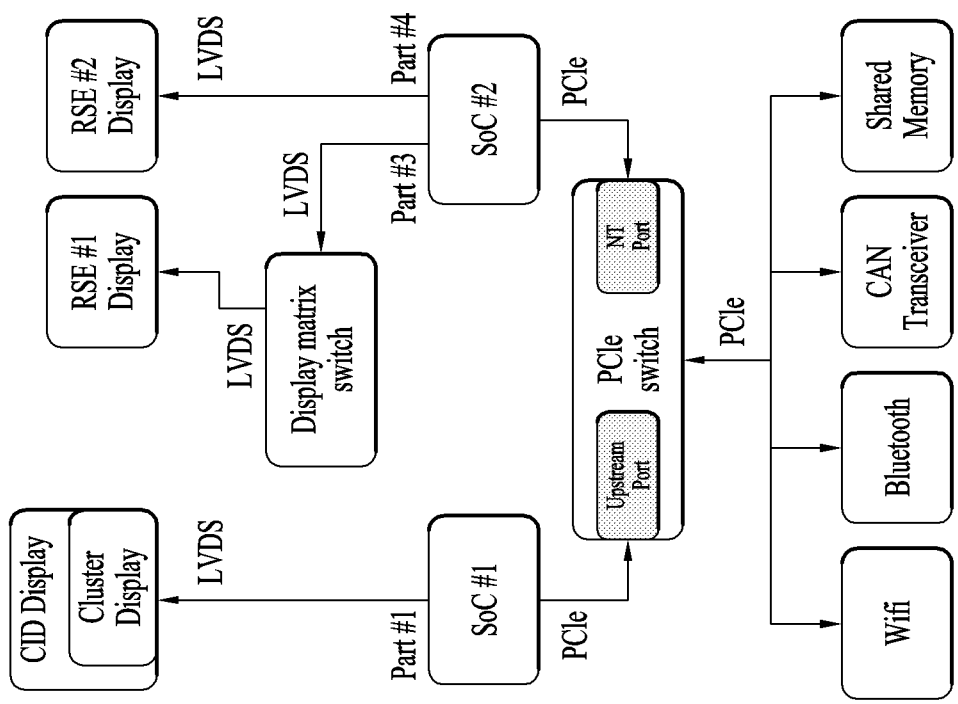
FIG. 12 shows operations before and after a fault of a display of a device for a vehicle according to an embodiment of the present invention.
Figure 12:
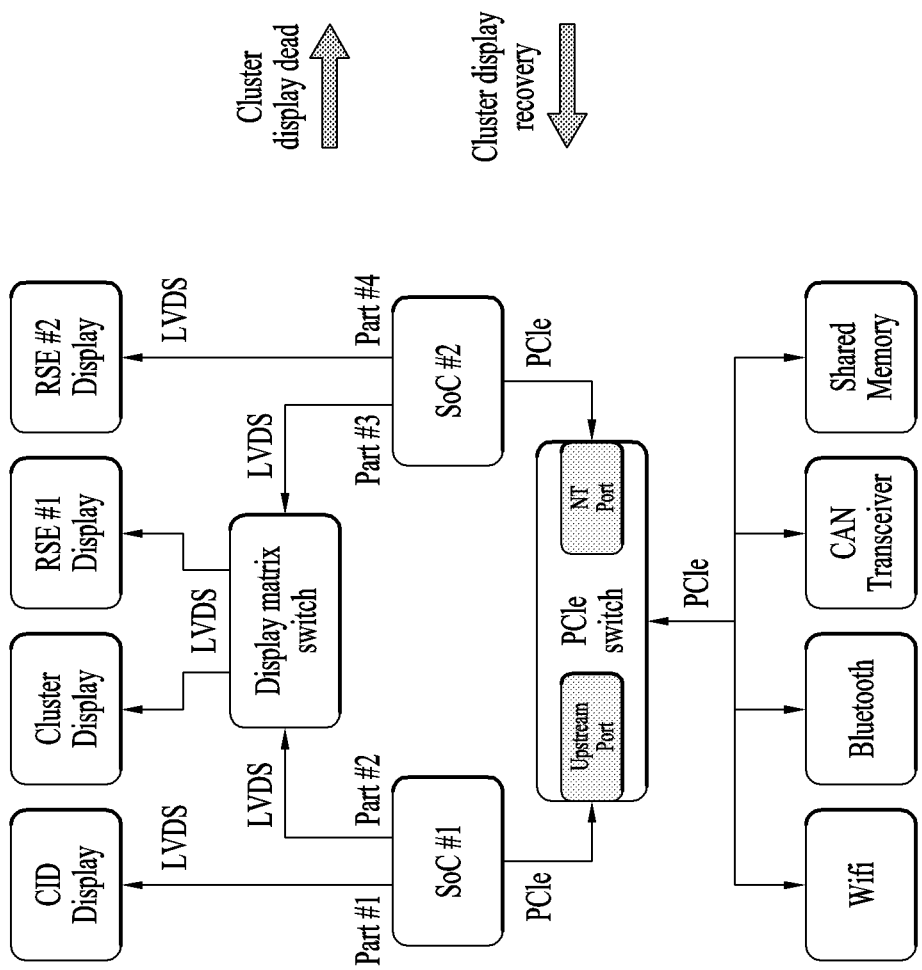

FIG. 12 shows operations before and after a fault of a display of a device for a vehicle according to an embodiment of the present invention.

The case in which the fault has occurred in the SoC has been described above, and fault responsive processing in a case in which a fault occurs in the display will be described below. A difference from the embodiment of FIG. 11 is that FIG. 11 is in the situation in which the information is no longer be able to be displayed on the display connected to the SoC because the fault has occurred in the SoC, whereas FIG. 12 is in a situation in which the SoC is able to normally output the information on the display connected to the SoC, but the display is not able to output the information normally because the fault has occurred in the display.

In other words, as shown in FIG. 12, the first SoC is executing the application related to the cluster information, and outputting information generated as a result of the execution on the cluster display. In this connection, when a fault that makes the normal operation impossible occurs in the cluster display, because the cluster information is important information, a method for continuing to display the cluster information is needed.

In this connection, the first SoC that is displaying the information on the cluster display may detect that the fault has occurred in the cluster display. According to an embodiment, the fault detection may be performed using a signal of a sideband connected to the display. Thereafter, the first SoC stops an operation of a port 2 of outputting the information on the cluster display. In addition, the first SoC switches a port from the port 2 to the port 1 and outputs the cluster information.

According to an embodiment, the information generated by executing the application related to the cluster information may be output by switching a path to the center information display instead of the cluster display. A left side of FIG. 12 is before the fault occurs in the cluster display, and a right side of FIG. 12 is after the fault occurs in the cluster display. That is, as shown on the right side of FIG. 12, the first SoC may output the cluster information on the center information display to provide the cluster information along with the central information to the driver without interruption. In this connection, a method for displaying the cluster information along with the central information on the center information display may vary according to embodiments. According to an embodiment, the cluster information may be overlaid on a portion of the center information display and displayed. Various display methods according to an embodiment will be described later.

Thereafter, when the fault that has occurred in the cluster display is recovered, the connection structure between the display and the SoC of the present invention is recovered to the structure shown on the left side of FIG. 12, so that the cluster display may display the cluster information again. Among the plurality of displays, the display in which the fault has occurred and the display that outputs the information in place of the display in which the fault has occurred may be changed according to embodiments.

Figure 13:
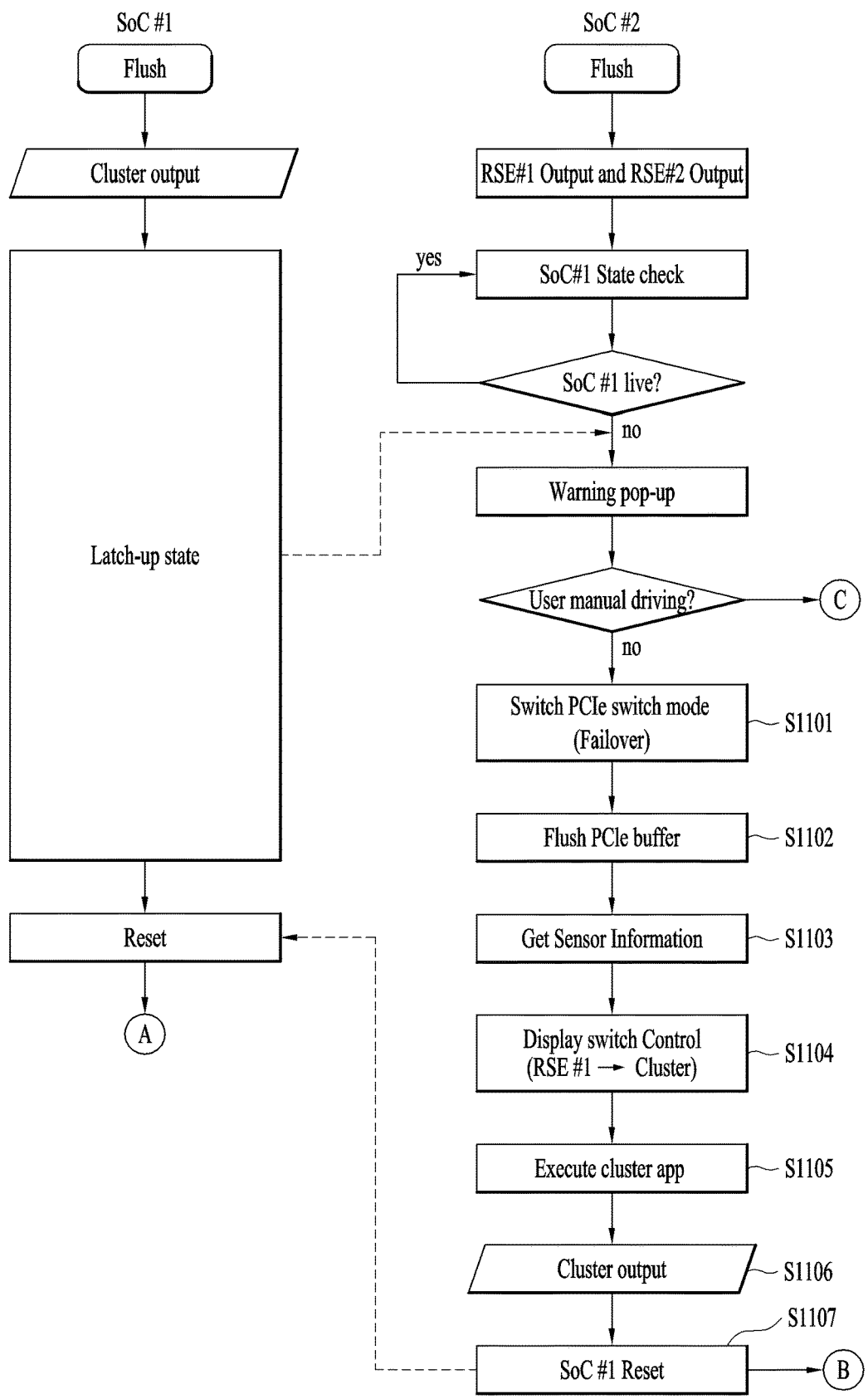
FIG. 13 shows a flowchart of SoC fault occurrence processing of a device for a vehicle according to an embodiment of the present invention.

FIG. 13 shows a flowchart of SoC fault occurrence processing of a device for a vehicle according to an embodiment of the present invention. Specifically, a flowchart of a switching operation between the plurality of SoCs at the time when the fault occurs in the SoC described above in FIG. 11 will be described with reference to FIG. 13.

The first SoC executes the cluster application and displays the cluster information on the cluster display. While the cluster display is operating, the latch-up, that is, the fault occurs in the first SoC.

In one example, the second SoC executes a rear application and outputs rear information on the first rear display and the second rear display. The second SoC may determine whether the first SoC is operating normally. That is, when the latch-up occurs due to the fault of the first SoC, the second SoC detects the latch-up state of the first SoC. When the fault occurs in the first SoC, the second SoC pops up a warning message indicating the occurrence of the fault in the first SoC on the display that is displaying the information, that is, the first rear display and/or the second rear display. Hereinafter, a flowchart of fault processing of the second SoC will be described. According to an embodiment, the second SoC may perform the fault processing based on a user manual mode. The user manual mode will be described later in FIG. 15.

Thereafter, the device for the vehicle according to an embodiment of the present invention switches the mode of the switch to the fail-over mode, which is a mode for the switching operation (S1101). In this connection, the mode of the switch is switched through a register of the switch. The device for the vehicle switches the mode of the switch to the fail-over mode by controlling the register of the switch. Thereafter, as described above in FIG. 10, the connection structure of the devices inside the switch, that is, a tree structure between bridges, connected to the first SoC is connected to the second SoC without being connected to the first SoC. In addition, communication information, sensor information, and the like of the switch are accessed by the second SoC through the tree structure between the bridges that is switched without any additional operation.

The device for the vehicle flushes a buffer in the switch (S1102). When the mode of the switch is the fail-over mode, the communication information or the sensor information of the switch may be incomplete because of the fault before or after the occurrence of the fault. Therefore, the buffer of the switch is flushed at the time of the fault to overcome the fault.

The device for the vehicle acquires the sensor information for the switching operation (S1103). The sensor information indicates information that may be accessed and acquired by the device for the vehicle. The switching operation may be performed through the sensor information.

The device for the vehicle changes a communication structure in which the display matrix switch and the first rear display are connected to each other. That is, the display matrix switch is switched such that the cluster application information may be output on the cluster display (S1104). In other words, the device for the vehicle controls the port of the display matrix switch to allow the cluster information to be output from the port of the second SoC.

The device for the vehicle executes the cluster application (S1105). When the cluster application is not able to be executed because the first SoC is not able to operate normally, the cluster application is packaged with a separate container for the application execution, and the second SoC executes the cluster application.

The device for the vehicle displays the cluster information on the switched cluster display (S1106).

The device for the vehicle transmits a reset signal for fault recovery of the first SoC to the first SoC (S1107). The reset signal generated in the second SoC is transmitted to the first SoC.

The device for the vehicle resets the first SoC to recover the first SoC from the fault. Hereinafter, a recovery process of the SoC after the fault processing will be described with reference to FIG. 14.

The recovery process of the SoC after the fault processing is performed subsequent to portions A and B of FIG. 13. Through the above-described process, the present invention may process the output of the cluster information by the second SoC instead when the fault occurs in the first SoC. Because the device for the vehicle according to an embodiment of the present invention may include the plurality of displays and the plurality of SoCs, the present invention may not be limited to the occurrence of the fault in the first SoC and the cluster information processing described above, and may relates to a fault in another SoC and another display information according to an embodiment.

Figure 14:
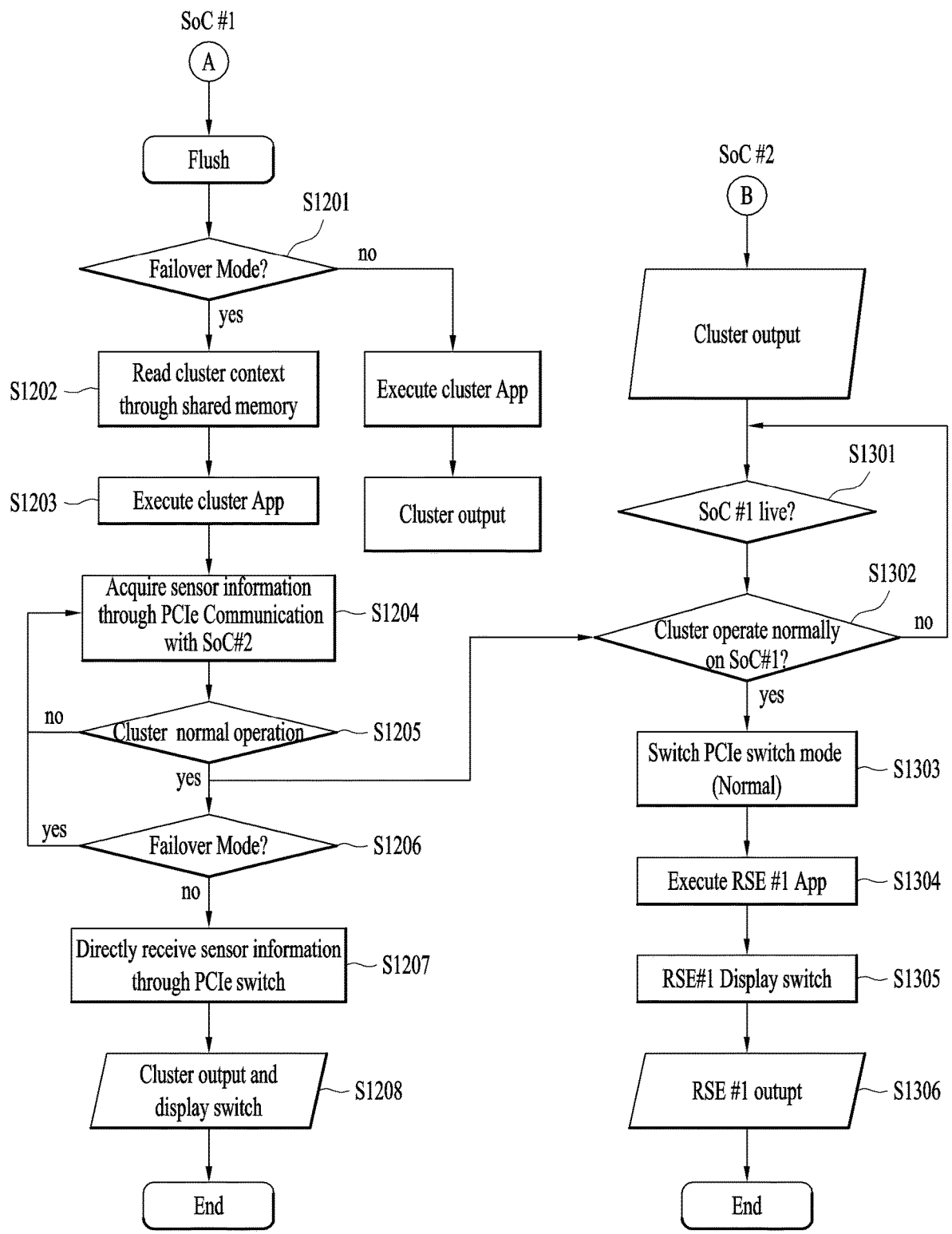
FIG. 14 shows a flowchart of SoC recovery processing of a device for a vehicle according to an embodiment of the present invention.

FIG. 14 shows a flowchart of SoC recovery processing of a device for a vehicle according to an embodiment of the present invention.

The first SoC in which the fault has occurred needs the recovery processing in order to operate normally again after the reset.

After the reset of the first SoC, the device for the vehicle according to the present invention determines whether the mode of the switch is the mode for the fault occurrence processing (the fail-over mode) (S1201). To determine whether the mode of the switch is the fail-over mode, the first SoC identifies the register of the switch, and executes the cluster application when the mode of the switch is the normal mode. In other words, when the mode of the switch is not the fail-over mode, the device for the vehicle executes the cluster application through the first SoC and outputs the cluster information on the cluster display.

When the mode of the switch is the fail-over mode (or may be referred to as a recovery mode or the like) for the fault occurrence processing, the device for the vehicle acquires the cluster-related context information through the shared memory (S1202). In this connection, the context information is required for the first SoC to receive the cluster information again from the second SoC that was outputting the cluster information, and execute and process the cluster information. In addition, the context information is required because the first SoC is not able to receive vehicle information through the sensor in the device for the vehicle in the state in which the first SoC is flushed and is in the fail-over mode. Therefore, the second SoC is in communication (host communication) with the switch to receive the vehicle information from the network device and the memory.

Thereafter, the device for the vehicle executes the cluster application through the first SoC (S1203).

The second SoC acquires the sensor information through the switch (S1204). The device for the vehicle determines whether the first SoC is able to normally operate the cluster display based on the acquired sensor information (S1205). The device for the vehicle determines that the cluster application or the cluster display are in a recoverable state when the cluster application or the cluster display are able to be operated normally based on the acquired sensor information. When it is determined that the first SoC is in the normal state, the first SoC notifies the second SoC that the first SoC has recovered normally (notify). Thereafter, the second SoC that has received the notification about the normal recovery, the second SoC switches the mode of the switch to the normal mode, and switches the switch such that the first SoC may use the existing bridge connection structure (tree structure) of the switch as it is.

When the processing of the cluster display in the first SoC is not normal, return to the sensor information acquisition operation (S1204) and continue to receive the sensor information. When the processing of the cluster display is normal, the device for the vehicle determines whether the mode of the switch is the fail-over mode (S1206). When the mode of the switch is the fail-over mode, return to the cluster normal operation determination operation (S1205). When the mode of the switch is not the fail-over mode, the first SoC receives the sensor information through the switch (S1207). Thereafter, the device for the vehicle outputs the cluster information on the cluster display through the first SoC (S1208).

In one example, when the fault occurs in the first SoC, the second SoC displays the cluster information on the cluster display instead of the first SoC without interruption.

Thereafter, the device for the vehicle determines whether the first SoC is able to operate after the reset (S1301). The device for the vehicle determines whether the cluster information may be normally processed by the first SoC (S1302). When the first SoC is not able to operate normally, the device for the vehicle processes and outputs the cluster information through the second SoC, and returns to operation S1301 of waiting for the first SoC to revive after the reset. When the first SoC is able to operate normally, the device for the vehicle switches the mode of the switch from the fail-over mode to the normal mode (S1303). The device for the vehicle executes a rear display application through the second SoC (S1304). The device for the vehicle switches the display in association with the second SoC from the cluster display to the rear display (S1305). The device for the vehicle outputs the rear display information through the switched first rear display (S1306).

As described above, during the fault recovery, the first SoC and the second SoC may be recovered such that the cluster function may be performed again by the first SoC.

Figure 15:
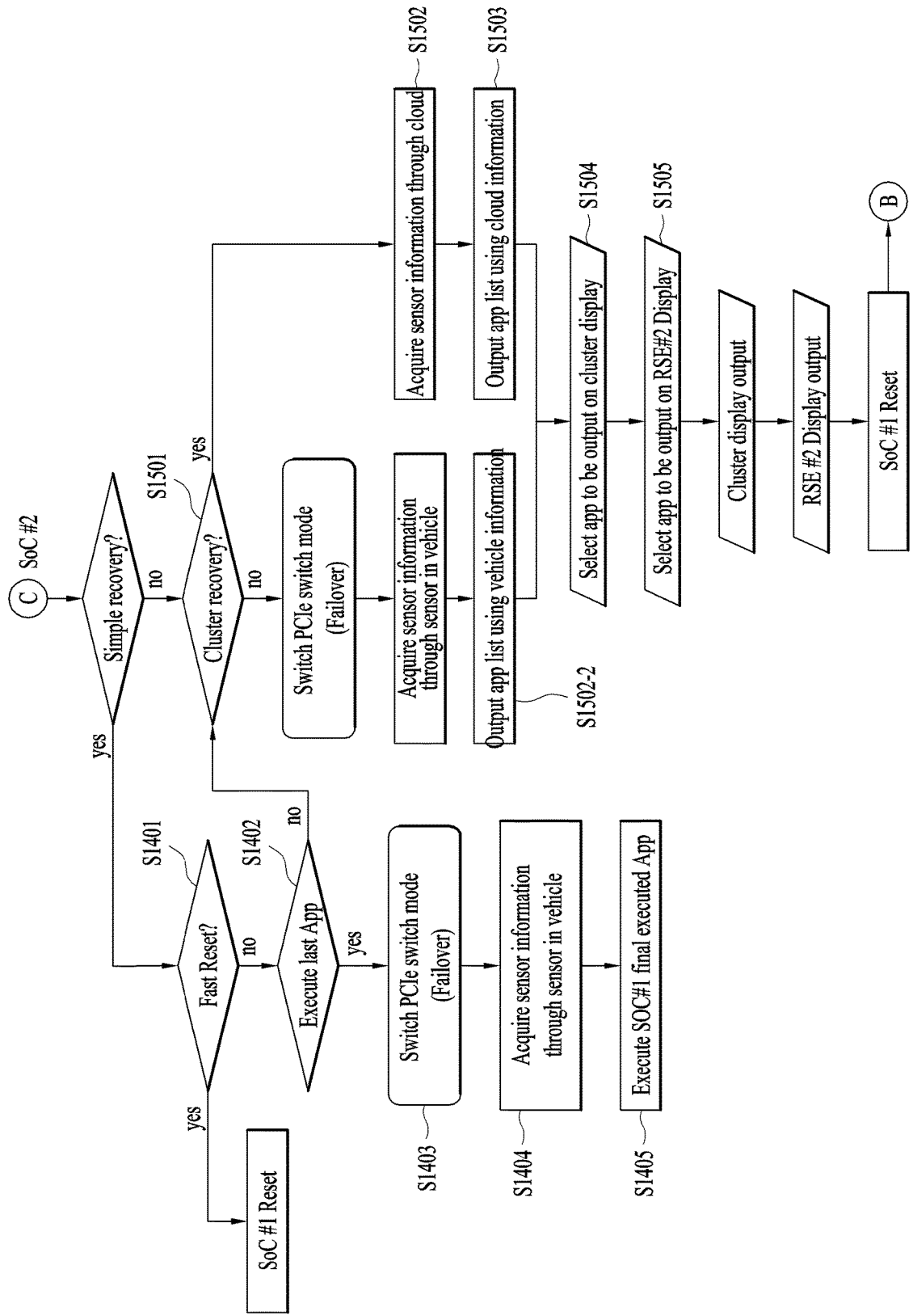
FIG. 15 shows a flowchart of a manual mode for SoC fault processing of a device for a vehicle according to an embodiment of the present invention.

FIG. 15 shows a flowchart of a manual mode for SoC fault processing of a device for a vehicle according to an embodiment of the present invention.

The device for the vehicle according to an embodiment of the present invention may provide additional modes for the switching and recovery operations for the SoC fault occurrence to the driver or the user. In this connection, the additional mode refers to a mode in which the user (hereinafter, means the user including the driver, the passenger, and the like) is able to select the application to be displayed in the process of switching and recovery operations for the fault occurrence.

In the process of determining whether the second SoC of FIG. 13 is manually driven, when the manual mode is selected, the device for the vehicle is operated according to the embodiment of FIG. 15.

The second SoC determines whether the recovery operation of the second SoC is performed in a simple recovery mode. When the recovery operation is performed in the simple recovery mode, the device for the vehicle determines whether to flush the first SoC by quick reset (S1401). When the user selects a mode of flushing the first SoC by the quick reset, the device for the vehicle quickly resets the first SoC in which the fault has occurred. In this connection, the reset refers to an operation in which a system of the first SoC is turned off and executed again.

When the user does not select the mode for flushing the first SoC by the quick reset, the device for the vehicle determines whether to execute a last application executed by the first SoC (S1402). When a mode for executing the last application executed by the first SoC is selected, the device for the vehicle changes the mode of the switch to the fail-over mode (S1403). The device for the vehicle acquires the sensor information from the sensors in the device for the vehicle through the communication of the switch (S1404). The first SoC executes the final application executed before the fault occurred (S1405).

In one example, when the recovery operation of the second SoC is not the simple recovery, the device for the vehicle determines whether to use a recovery mode using a cloud (S1501). When the cloud recovery mode is selected, the device for the vehicle acquires the sensor information from the cloud connected through the network device or the like (S1502). The device for the vehicle acquires an application list using the cloud, and outputs the acquired list on the display (S1503).

In addition, when the cloud recovery mode is not selected, the device for the vehicle switches the mode of the switch to the fail-over mode. Through the switch in the fail-over mode, the device for the vehicle acquires the sensor information from the sensors in the vehicle. The device for the vehicle outputs the application list on the display using the acquired sensor information (S1502-2). Compared with the cloud recovery mode described above, the cloud recovery mode may acquire various sensor information and the application list using the cloud, and output the sensor information and the application list on the display. When the cloud recovery mode is not used, the application list is displayed on the display using in-vehicle local information and a local application list.

After the acquired application list (S1502-2 and S1503) is output, the device for the vehicle receives information from the user and selects an application to be displayed on the cluster display (S1504). Similarly, the device for the vehicle selects an application to be displayed on the second rear display by receiving information from the user (S1505). Thereafter, the cluster display and the second rear display output the selected application based on the selected application, and the device for the vehicle resets the first SoC.

Figure 16:
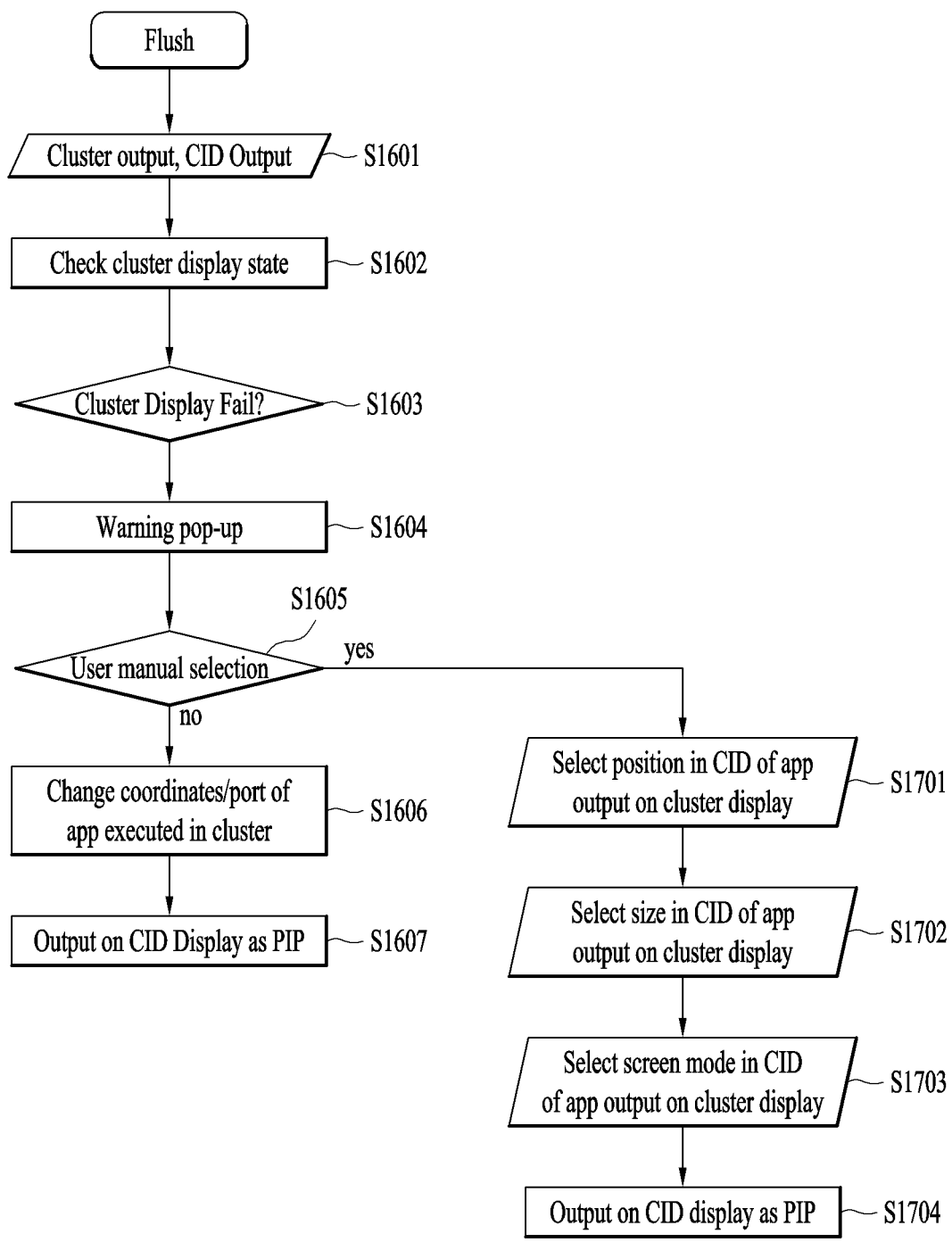
FIG. 16 is a flowchart illustrating display fault occurrence processing of a device for a vehicle according to an embodiment of the present invention.

FIG. 16 is a flowchart illustrating display fault occurrence processing of a device for a vehicle according to an embodiment of the present invention.

The device for the vehicle according to an embodiment of the present invention may provide the additional modes for the switching operation and the recovery operation for fault response when the fault occurs in the display in the vehicle. After the first SoC is flushed, the first SoC executes the cluster application, outputs the cluster information on the cluster display, executes the central information application, and outputs the central information on the center information display (S1601). The first SoC identifies the state of the cluster display (S1602). The first SoC determines whether the fault has occurred in the cluster display (S1603). When the fault occurs in the cluster display, the first SoC displays a warning pop-up message on the cluster display or center information display in communication with the first SoC (S1604). The device for the vehicle determines whether to execute the manual mode based on the user manual mode (S1605). When the device for the vehicle receives information on the selection of the manual mode from the user, the device for the vehicle may adjust a position to output the cluster application information in the center information display based on the manual mode received from the user (S1701). Referring to the display fault response operation described above in FIG. 12, the center information display outputs the cluster application information together with the central information application on the center information display instead of the cluster display in which the fault has occurred.

The device for the vehicle according to an embodiment of the present invention may adjust the position to output the cluster application in the center information display through the user manual mode based on the manual mode received from the user. Furthermore, the device for the vehicle may adjust an output size of the cluster application in the center information display based on the manual mode received from the user (S1702). In addition, the device for the vehicle may select a mode of a screen on which the cluster application is output of the center information display based on the manual mode received from the user (S1703). The device for the vehicle outputs the application information on the center information display based on the finally selected setting information (the position, the size, the screen mode, and the like described above).

In one example, when the manual mode is not executed, the device for the vehicle changes coordinates and port information of the application executed in the cluster display (S1606). Thereafter, the device for the vehicle outputs the cluster application information as a picture in picture (PIP) on the center information display (S1607).

It is understood by those skilled in the art that various changes and modifications are possible in the present invention without departing from the spirit or scope of the present invention. Accordingly, the present invention is intended to include changes and modifications of the present invention provided within the appended claims and equivalent ranges thereof.

In the present specification, both apparatus and method inventions are mentioned, and descriptions of both the apparatus and method inventions may be applied to complement each other.

The module, unit, or block according to embodiments of the present invention may be a processor (a processor including hardware or software according to an embodiment) that executes consecutive execution processes stored in a memory (or a storage unit). Each step or method described in the above-described embodiment may be performed by hardware/software/processors. In addition, the methods presented by the present invention may be executed with codes. These codes may be written to a storage medium that may be read by the processor, and thus may be read by the processor provided by the apparatus according to embodiments of the present invention.

Various embodiments have been described in forms for carrying out the present invention.

The present invention is used in a field of a management and control system for a vehicle.

It is obvious to those skilled in the art that various changes and modifications are possible in the present invention without departing from the spirit or scope of the present invention. Therefore, the present invention is intended to include changes and modifications of the present invention provided within the appended claims and equivalent ranges thereof.

What is claimed is:

1. A device for a vehicle, the device comprising:
a first System on Chip (SoC) configured to control one or more displays in a normal mode; and
a second SoC configured to control one or more displays that are different from the one or more displays for the first SoC in the normal mode,
wherein the first SoC and the second SoC are connected to a switch,
wherein the switch is connected to a memory for sharing data between the first SoC and the second SoC and processing a fault for the first SoC,
wherein data for the first SoC in the normal mode is stored in the memory,
wherein the switch includes an upstream port and a Non-Transparent (NT) port,
wherein the upstream port is connected to the first SoC and the NT port is connected to the second SoC, and
wherein, based on the first SoC being in a fault mode and the second SoC being in the normal mode, (i) control of a display for the first SoC is processed based on the second SoC, the switch, and the memory and (ii) the upstream port is connected to the second SoC and the NT port is connected to the first SoC to enable the second SoC to access, through the upstream port, the data for the first SoC in the normal mode stored in the memory, communicate with the memory, and continue output of information for the first SoC on the display for the first SoC without requiring a hardware reset operation of the first SoC.

2. The device of claim 1,
wherein, based on the first SoC being in the fault mode and the second SoC being in a fail-over mode, (i) the second SoC accesses to a memory for the first SoC and (ii) a device connected to the second SoC executes an application related to the first SoC.

3. The device of claim 1, wherein, based on a first device connected to the first SoC being in a fault mode, a second device connected to the first SoC generates display related to the first SoC in place of the first device.

4. The device of claim 1,
wherein a device connected to the first SoC displays cluster information, and
wherein, based on the first SoC being in the fault mode, the switch displays the cluster information based on a device connected to the second SoC in response to a fail-over mode.

5. The device of claim 1,
wherein a fault for the first SoC is recovered, the first SoC that is not the second SoC displays cluster information.

6. A method for controlling a device for a vehicle, the method comprising:
controlling one or more displays based on a first System on Chip (SoC) being in a normal mode; and
controlling one or more displays that are different from the one or more displays for the first SoC based on a second SoC being in the normal mode,
wherein the first SoC and the second SoC are connected to a switch,
wherein the switch is connected to a memory for sharing data between the first SoC and the second SoC and processing a fault for the first SoC,
wherein data for the first SoC in the normal mode is stored in the memory,
wherein the switch includes an upstream port and a Non-Transparent (NT) port,
wherein the upstream port is connected to the first SoC and the NT port is connected to the second SoC, and
wherein, based on the first SoC being in a fault mode and the second SoC being in the normal mode, (i) controlling of a display for the first SoC is processed based on the second SoC, the switch, and the memory, and (ii) the upstream port is connected to the second SoC and the NT port is connected to the first SoC to enable the second SoC to access, through the upstream port, the data for the first SoC in the normal mode stored in the memory communicate with the memory, and continue output of information for the first SoC on the display for the first SoC without requiring a hardware reset operation of the first SoC.

7. The method of claim 6, wherein, based on the first SoC being in the fault mode and the second SoC being in a fail-over mode, (i) the second SoC accesses to a memory for the first SoC and (ii) a device connected to the second SoC executes an application related to the first SoC.

8. The method of claim 6, wherein, based on a first device connected to the first SoC being in a fault mode, a second device connected to the first SoC generates display related to the first SoC in place of the first device.

9. The method of claim 6,
wherein a device connected to the first SoC displays cluster information, and
wherein, based on the first SoC being in the fault mode, the switch displays cluster information based on a device connected to the second SoC in response to a fail-over mode.

10. The method of claim 6,
wherein a fault for the first SoC is recovered, the first SoC that is not the second SoC displays cluster information.

11. The device of claim 1, wherein, in the fault mode, a fault has occurred at the first SoC or the second SoC.

12. The device of claim 1, wherein, based on a mode of the first SoC being changed from the fault mode to the normal mode, the upstream port is connected to the first SoC and the NT port is connected to the second SoC.

13. The method of claim 6, wherein, in the fault mode, a fault has occurred at the first SoC or the second SoC.

14. The method of claim 6, wherein, based on a mode of the first SoC being changed from the fault mode to the normal mode, the upstream port is connected to the first SoC and the NT port is connected to the second SoC.

* * * * *